US012762677B1

(12) United States Patent
Moskovitz et al.

(10) Patent No.: US 12,762,677 B1
(45) Date of Patent: Oct. 13, 2026

(54) VEHICLE INSPECTION SYSTEM AND METHOD WITH THREE-DIMENSIONAL DEFECT CLUSTERING ON CAD MODELS

(71) Applicant: UVeye Ltd., Tel Aviv (IL)

(72) Inventors: Yonatan Moskovitz, RaAnana (IL); Shirel Gazit, London (GB); Roy Orfaig, Beit Hashmonai (IL); Ilya Grinshpoun, Ramat Gan (IL); Jonathan Sade, Ganot (IL); Itai Orr, Or Akiva (IL); Amir Hever, Tenafly, NJ (US)

(73) Assignee: UVeye Ltd., Tel Aviv (IL)

( * ) Notice: Subject to any disclaimer, the term of this patent is extended or adjusted under 35 U.S.C. 154(b) by 0 days.

(21) Appl. No.: 19/438,516

(22) Filed: Dec. 31, 2025

Related U.S. Application Data

(63) Continuation of application No. 19/438,486, filed on Dec. 31, 2025.

(51) Int. Cl.

| | |
|---|---|
| ***G06T 7/00*** | (2017.01) |
| ***G01N 21/88*** | (2006.01) |
| ***G06T 7/246*** | (2017.01) |
| ***G06T 7/33*** | (2017.01) |
| ***G06T 7/73*** | (2017.01) |

(Continued)

(52) U.S. Cl.
CPC ....... *G06T 7/0002* (2013.01); *G01N 21/8851* (2013.01); *G06T 7/251* (2017.01); *G06T 7/344* (2017.01); *G06T 7/75* (2017.01); *G06T 15/06* (2013.01); *G06V 10/751* (2022.01); *G06V 10/761* (2022.01); *G06V 10/762* (2022.01); *G06V 10/764* (2022.01); *G01N 2021/8887* (2013.01); *G06T 2207/20084* (2013.01); *G06T 2207/30244* (2013.01); *G06T 2210/21* (2013.01); *G06V 10/82* (2022.01); *G06V 20/50* (2022.01)

(58) Field of Classification Search
None
See application file for complete search history.

(56) References Cited

U.S. PATENT DOCUMENTS

2018/0012350 A1 1/2018 Gangitano et al.
2018/0260793 A1 9/2018 Li et al.

(Continued)

FOREIGN PATENT DOCUMENTS

CN 111129995 B * 6/2021 ............... H04N 5/33

OTHER PUBLICATIONS

Detection and characterization of defects on mechanical structures by using 3D vision, by Belbacha et al. HAL open science, HAL Id: hal-04168243, Jul. 21, 2023 (Year: 2023).*

(Continued)

*Primary Examiner* — Vikkram Bali

(57) ABSTRACT

A vehicle inspection system consolidates redundant multi-view defect detections using three-dimensional spatial clustering on CAD models. The system projects two-dimensional defect detections from multiple camera viewpoints onto three-dimensional CAD model surfaces through ray-casting algorithms, then clusters projected locations based on geodesic distances to identify unique physical defects. This approach eliminates detection redundancy while providing precise spatial localization, enabling consistent defect tracking across multiple inspections regardless of vehicle positioning variations.

19 Claims, 9 Drawing Sheets

(51) Int. Cl.

| | |
|---|---|
| ***G06T 15/06*** | (2011.01) |
| ***G06V 10/74*** | (2022.01) |
| ***G06V 10/75*** | (2022.01) |
| ***G06V 10/762*** | (2022.01) |
| ***G06V 10/764*** | (2022.01) |
| ***G06V 20/50*** | (2022.01) |
| *G06V 10/82* | (2022.01) |

(56) References Cited

U.S. PATENT DOCUMENTS

| | | | | |
|---|---|---|---|---|
| 2019/0304099 | A1* | 10/2019 | Hever | G06T 7/001 |
| 2021/0174117 | A1* | 6/2021 | Hever | G06F 18/25 |
| 2023/0245240 | A1* | 8/2023 | Dev | G06V 10/70 382/103 |
| 2024/0394902 | A1* | 11/2024 | Mcvey | G01N 21/6458 |
| 2024/0404041 | A1 | 12/2024 | Hever et al. | |
| 2025/0234024 | A1* | 7/2025 | Taquet | H04N 19/597 |

OTHER PUBLICATIONS

Translation for CN 111129995 B (Year: 2021).*

Official Action Dated Feb. 25, 2026 from the US Patent and Trademark Office Re. U.S. Appl. No. 19/438,486. (17 Pages).

* cited by examiner

VEHICLE INSPECTION SYSTEM AND METHOD WITH THREE-DIMENSIONAL DEFECT CLUSTERING ON CAD MODELS

RELATED APPLICATION/S

This application is a Continuation of U.S. patent application Ser. No. 19/438,486 filed on Dec. 31, 2025, the contents of which are incorporated herein by reference in their entirety.

FIELD AND BACKGROUND OF THE INVENTION

The present invention relates generally to automated vehicle inspection systems and methods. More particularly, the invention relates to systems and methods for detecting, localizing, and tracking vehicle defects using multi-view imaging, template-based comparison techniques, and three-dimensional spatial clustering.

Automated vehicle inspection has become increasingly important in various industries, including automotive manufacturing, fleet management, rental car operations, and vehicle inspection stations. Traditional manual inspection methods are time-consuming, subjective, and prone to human error. Moreover, manual inspections often fail to detect subtle defects or to consistently track defect evolution over time.

Early automated inspection systems relied on simple threshold-based image processing techniques to detect anomalies. However, these systems suffered from high false positive rates due to variations in lighting conditions, vehicle positioning, and environmental factors such as dirt, water, or shadows. Such systems typically analyzed single-view images in isolation, making it difficult to obtain comprehensive coverage of a vehicle's exterior surface.

More recent systems have employed machine learning techniques, particularly deep neural networks, to classify vehicle defects. While these approaches have improved detection accuracy, they require extensive labeled training data for each defect type and vehicle model. Furthermore, these systems often struggle with novel defect types not represented in the training data. Retraining detection models to accommodate new defect types is computationally expensive and time-consuming, limiting the adaptability of such systems in dynamic operational environments.

Multi-view imaging systems have been proposed to provide more complete vehicle coverage. These systems typically deploy multiple cameras around an inspection lane to capture images of a vehicle from different angles. However, multi-view systems introduce a significant technical challenge: the same physical defect may be detected multiple times by different cameras viewing the defect from different angles. This redundancy leads to inflated defect counts and creates ambiguity about the actual number and location of defects on the vehicle. Without proper consolidation, operators receive confusing inspection reports that list the same defect multiple times with different spatial coordinates.

A technical challenge of multi-view redundancy in physical inspection systems arises from fundamental geometric constraints of camera-based measurement systems. When multiple cameras with fixed spatial positions and orientations observe the same three-dimensional physical defect, each camera records a two-dimensional projection of that defect at different pixel coordinates determined by the camera's intrinsic parameters and extrinsic pose relative to the vehicle surface. The spatial transformation between these multiple two-dimensional observations and the underlying three-dimensional physical defect location requires precise geometric calibration of camera positions, accurate three-dimensional surface models, and computationally intensive ray-casting operations to establish correspondence. Conventional image stitching approaches fail because vehicle surfaces exhibit complex three-dimensional curvature that creates non-linear distortions when projected onto two-dimensional image planes, resulting in geometric inconsistencies that cannot be resolved through simple homographic transformations. The physical arrangement of cameras around the inspection lane creates overlapping fields of view with varying parallax effects, making pixel-level correspondence unreliable without explicit three-dimensional geometric reasoning.

SUMMARY OF THE INVENTION

According to an aspect of some embodiments of the present invention, there is provided a vehicle inspection system comprising an imaging assembly having a camera array configuration, for example with multiple cameras positioned around a vehicle inspection lane, and one or more processors configured to retrieve vehicle-specific reference templates, align them to captured images using geometric transformations, compute spatially-registered similarity maps, generate deviation maps, and distinguish persistent defects from transient conditions through temporal comparison across multiple inspections.

The physical camera array configuration may comprise multiple imaging sensors positioned at predetermined locations around a vehicle inspection lane, with each camera optionally having calibrated intrinsic parameters including, for example, focal length, principal point coordinates, and radial distortion coefficients, and extrinsic parameters defining the camera's three-dimensional position and orientation relative to a common coordinate system. The spatial arrangement may ensure that vehicle surfaces are captured from multiple viewing angles with, for example, sufficient baseline separation to enable triangulation-based depth estimation and geometric correspondence analysis. The imaging assembly may incorporate structured mounting hardware that maintains precise camera positioning within tolerance specifications, and may include environmental enclosures that protect the optical systems while providing controlled illumination conditions for consistent image capture across varying ambient lighting.

According to another aspect of some embodiments, there is provided a method for consolidating vehicle defect detections from multiple viewpoints by projecting two-dimensional defect detections onto three-dimensional CAD model surfaces and clustering the projected locations based on spatial proximity to identify unique physical defects, thereby eliminating redundant multi-view detections.

Aspects of some embodiments address technical deficiencies in automated vehicle inspection systems that arise from the complexity of correlating multi-view observations with physical defect locations. Current multi-view inspection systems suffer from detection redundancy wherein a single physical defect generates multiple separate detections when observed from different camera viewpoints. This redundancy occurs because conventional systems analyze images independently without establishing three-dimensional spatial relationships between detected anomalies, resulting from the geometric correspondence problem inherent in projecting three-dimensional physical defects onto two-dimensional image planes through cameras with varying intrinsic parameters and extrinsic poses. The resulting inspection reports contain inflated defect counts and spatially ambiguous information that prevents operators from determining the actual number and precise locations of defects on the vehicle surface.

Existing template-based inspection approaches rely on static, generic templates that fail to accommodate legitimate vehicle-specific variations including aftermarket accessories, regional equipment differences, custom modifications, and normal wear patterns. These generic templates generate excessive false positives when encountering features that deviate from idealized reference models but represent normal vehicle-specific characteristics rather than actual defects. The absence of adaptive learning mechanisms prevents systems from incorporating validated inspection outcomes to refine detection accuracy over time, resulting in persistent false alarms for identical benign features at every subsequent inspection. Furthermore, current inspection systems cannot reliably distinguish between pre-existing damage and newly occurred damage across multiple vehicle inspections due to variations in vehicle positioning within inspection lanes and lack of consistent spatial reference frameworks, making direct pixel-level image comparison unreliable when vehicles are positioned differently between visits.

Embodiments of the present invention provide a comprehensive technical solution integrating three-dimensional spatial clustering with adaptive template learning to overcome these fundamental limitations. The system may employ computer-aided design models as precise geometric reference frameworks for consolidating multi-view detections, wherein two-dimensional defect detections from multiple camera viewpoints may be projected onto three-dimensional CAD model surfaces through ray-casting algorithms utilizing calibrated camera parameters. The projected three-dimensional locations may undergo spatial clustering analysis based on geodesic distances measured along CAD surface topology, correctly identifying when multiple two-dimensional detections correspond to the same physical defect observed from different viewpoints and consolidating redundant detections into single, accurately localized defect reports.

The system may implement per-vehicle templates that evolve through gated learning based on validated inspection outcomes, wherein initial templates may be established during first vehicle inspections and progressively refined as regions are confirmed as normal or defective through operator validation or automated confidence assessment. The adaptive learning mechanism may incorporate confirmed normal regions into the evolving template while excluding confirmed defective regions, enabling personalized defect detection that accommodates vehicle-specific characteristics while maintaining sensitivity to genuine anomalies. The system may compute multiple complementary spatially-registered similarity maps including, for example, deep-feature correlation derived from convolutional neural network features, edge-distance maps computed from geometric structure analysis, phase-only correlation maps robust to illumination variations, and photometrically-normalized intensity correlation maps, with these diverse similarity measures optionally fused into comprehensive deviation maps that capture different aspects of appearance correspondence.

The integrated technical approach may provide measurable benefits including geometric precision and spatial consistency achieved through leveraging manufacturer CAD models as geometric reference frameworks, enabling sub-millimeter spatial accuracy in defect localization and maintaining consistent spatial coordinates across multiple inspections regardless of vehicle positioning variations. The three-dimensional clustering process may eliminate detection redundancy while preserving precise spatial relationships, enabling reliable defect tracking over time and accurate damage liability assessment. The adaptive template learning mechanism may reduce false positive detection rates by incorporating vehicle-specific knowledge accumulated over validated inspections, with fleet-level statistical analysis potentially demonstrating false positive rate reductions while maintaining or improving true positive detection rates for genuine defects.

Computational efficiency may be achieved through utilizing pre-existing CAD models which eliminates computational overhead and potential errors associated with real-time three-dimensional reconstruction from captured images, enabling processing speeds suitable for real-time inspection applications while maintaining geometric accuracy that would be impossible with reconstruction-based approaches under varying lighting conditions and surface properties. The CAD model-based spatial reference framework may enable seamless integration of inspection data from different inspection systems including mobile inspection units and fixed-position stations, with defect locations consistently mapped onto common three-dimensional coordinates facilitating comprehensive vehicle history tracking across heterogeneous inspection infrastructures.

The three-dimensional spatial clustering approach may provide temporal defect tracking that distinguishes persistent damage requiring maintenance attention from transient conditions that do not represent actual defects, accurately identifying defect progression, repair verification, and damage liability determination through spatially-consistent comparison of inspection results over time. These technical benefits collectively address critical limitations of existing vehicle inspection systems while providing measurable improvements in accuracy, reliability, and operational efficiency that directly translate to cost savings and improved decision-making in fleet management and vehicle rental applications.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
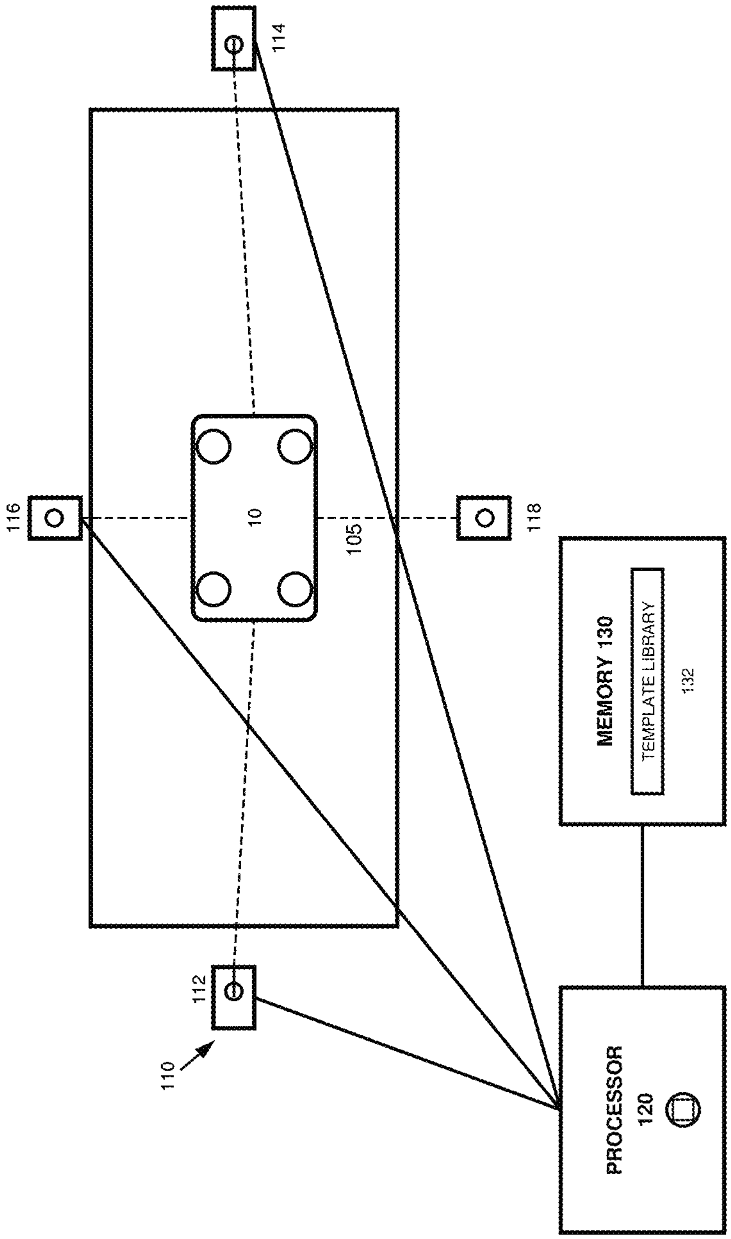
FIG. 1 is a schematic diagram of a vehicle inspection system in accordance with an embodiment of the invention, showing an imaging assembly with multiple cameras positioned around a vehicle inspection lane and associated processing components.

The present invention relates generally to automated vehicle inspection systems and methods. More particularly, the invention relates to systems and methods for detecting, localizing, and tracking vehicle defects using multi-view imaging, template-based comparison techniques, and three-dimensional spatial clustering.

Existing approaches to multi-view defect consolidation have relied on image stitching techniques that attempt to create panoramic views of the vehicle by merging images from different cameras. However, image stitching is notoriously difficult for three-dimensional objects like vehicles, particularly in regions with complex geometry such as wheel wells, mirrors, and body contours. Stitching artifacts, parallax errors, and alignment inaccuracies can obscure defects or create false detections.

Some systems have attempted to use generic three-dimensional reconstruction techniques, such as structure-from-motion or multi-view stereo, to build a 3D model of the inspected vehicle and project defect detections onto this reconstructed surface. However, these reconstruction techniques are computationally intensive and often produce incomplete or inaccurate models, particularly for reflective or textureless vehicle surfaces. The quality of reconstruction is highly dependent on lighting conditions, surface properties, and camera calibration accuracy.

Another limitation of conventional systems is their inability to effectively track defects over time. In fleet management and rental car applications, it is crucial to distinguish between pre-existing damage and newly occurred damage. Simply comparing current images to previous images is insufficient because vehicles may be positioned differently in the inspection lane at each visit, making direct image comparison unreliable. Temporal tracking requires spatial alignment across inspections, which conventional 2D image-based approaches fail to provide consistently.

Template-based inspection methods have shown promise for detecting deviations from expected vehicle appearance. However, conventional template matching approaches typically use generic templates derived from pristine vehicle models or stock photographs. These generic templates fail to account for legitimate vehicle-specific variations such as aftermarket accessories, custom paint jobs, decals, or regional equipment differences. As a result, systems relying on generic templates generate excessive false positives when encountering normal vehicle-specific features that differ from the generic template.

Furthermore, conventional template-based systems do not adapt over time. They compare each inspection to a static reference, failing to learn from inspection outcomes or to incorporate validated information about which features are normal for a particular vehicle. This static approach results in repeated false alarms for the same benign features at every inspection.

Additionally, prior art systems have not effectively leveraged prior knowledge about vehicle geometry in the form of computer-aided design (CAD) models. Automotive manufacturers and suppliers maintain highly accurate CAD models of every vehicle they produce, yet these valuable geometric references remain unused in most inspection systems. The integration of CAD models with real-world inspection data presents opportunities for improved accuracy, multi-view correspondence, and precise defect localization that have not been realized in existing systems.

Existing multi-view systems have attempted to address redundancy through image stitching, but fail to account for three-dimensional vehicle geometry. Simple 2D image registration cannot properly handle parallax effects and occlusion boundaries that occur when the same physical defect appears at different apparent locations in cameras with significant baseline separation. Prior template matching systems use static, generic templates that generate false positives for vehicle-specific variations, lacking the adaptive learning mechanisms necessary for personalized defect detection.

The three-dimensional projection onto CAD surfaces may operate through a sequence of coordinate transformations that map two-dimensional pixel coordinates in camera image planes to three-dimensional surface coordinates on the CAD model geometry. For each detected defect characterized by pixel coordinates (u,v) in a camera image, the system may first apply the inverse camera calibration matrix to convert pixel coordinates to normalized camera coordinates, then may construct a three-dimensional ray vector extending from the camera optical center through the normalized coordinates into world space using the camera's extrinsic rotation and translation parameters. The ray-surface intersection computation may involve testing this ray against the triangular mesh faces of the CAD model using, for example, Möller-Trumbore intersection algorithms or similar computational geometry techniques, yielding the precise three-dimensional coordinates where the defect observation ray intersects the vehicle surface. This geometric projection process may account for the physical constraints of the camera optics, including lens distortion effects that cause straight lines in three-dimensional space to appear curved in the image plane, and the finite depth of field that affects focus quality at different distances from the camera.

There is therefore a need for an improved vehicle inspection system that can accurately detect vehicle defects across multiple viewpoints, effectively consolidate redundant detections to identify unique physical defects, adapt templates based on vehicle-specific characteristics and inspection history, track defects over time with spatial consistency, and leverage prior geometric knowledge to improve accuracy and robustness.

Embodiments of the present invention address the aforementioned deficiencies in the prior art by providing an integrated vehicle inspection system and method that combines template-based anomaly detection with three-dimensional spatial clustering to achieve accurate, comprehensive, and temporally consistent vehicle defect identification.

In accordance with one aspect of the invention, a vehicle inspection system is provided that may employ multi-view imaging combined with adaptive template matching to detect vehicle defects with high accuracy while minimizing false positives. The system retrieves vehicle-specific reference templates and aligns them to captured images using geometric transformations. By computing multiple spatially-registered similarity maps and fusing them into deviation maps, the system identifies anomalies with greater reliability than single-metric approaches. The system may further distinguish persistent defects from transient conditions by comparing deviation maps across multiple inspections of the same vehicle, thereby providing temporal context that is critical for fleet management and damage liability determination.

The template-based approach may use evolving per-vehicle templates that may be initialized upon first inspection and progressively refined based on validated inspection outcomes. This adaptive learning approach may eliminate false positives caused by legitimate vehicle-specific variations while maintaining sensitivity to genuine defects. The system may optionally combine per-vehicle templates with fleet-level class templates, weighting evidence from both sources using learned uncertainty weights to achieve optimal detection performance across diverse vehicle conditions and inspection scenarios.

In accordance with another aspect of the invention, the system addresses the critical problem of multi-view detection redundancy through three-dimensional spatial clustering. When multiple cameras observe the same physical defect from different viewpoints, conventional systems report multiple separate detections, leading to inflated defect counts and spatial ambiguity. The present invention solves this problem by projecting two-dimensional defect detections onto a three-dimensional reference model representing the vehicle geometry, then clustering the projected three-dimensional locations based on spatial proximity. This approach consolidates redundant detections into single, accurately localized defects, providing operators with clear, unambiguous inspection reports.

An advantageous feature of the three-dimensional clustering approach may be the use of computer-aided design models as the reference geometry. Rather than relying on computationally expensive and error-prone three-dimensional reconstruction from captured images, the system may retrieve a high-fidelity CAD model corresponding to the inspected vehicle. The CAD model may provide precise, complete geometric information that enables accurate projection and clustering even for complex vehicle surfaces and challenging viewing angles. Camera poses relative to the CAD model may be determined through optimization of reprojection error, providing extrinsic calibration that adapts to vehicle position variations.

The integration of template-based detection with three-dimensional clustering may provide synergistic benefits that exceed the capabilities of either approach alone. The template matching component may excel at detecting subtle anomalies and tracking changes over time, while the three-dimensional clustering component may ensure that multi-view detections are properly consolidated with accurate spatial localization. The combined system may leverage prior geometric knowledge in the form of CAD models both for synthesizing reference templates and for performing spatial clustering, creating a unified framework that exploits the complementary strengths of image-based and geometry-based analysis.

Additional features of embodiments of the invention may include exemplar-based defect detection that enables identification of new defect types without retraining detection models, polarization-controlled imaging for separating diffuse and specular reflection components, undercarriage panorama construction with reference template comparison, severity scoring based on multiple factors including depth measurements and temporal persistence, and automatic detection of camera misalignment through CAD model reprojection analysis.

Embodiments of the present invention may further provide methods for comparing inspection data from different inspection systems by aligning defect locations onto a common three-dimensional reference model, and for generating heat map visualizations showing defect frequency patterns across vehicle fleets. These capabilities may enable comprehensive quality monitoring and proactive maintenance planning based on aggregate defect occurrence data.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As used herein, the term "vehicle identifier" may refer to any data element or combination of data elements that uniquely identifies or characterizes a vehicle, including but not limited to license plate numbers, vehicle identification numbers, radio frequency identification tags, make and model designations, year of manufacture, or any other identifying information that enables retrieval of vehicle-specific data from a database or memory system.

As used herein, the term "spatial pose" may refer to the position and orientation of an object in three-dimensional space, typically represented by translation parameters defining the object's location and rotation parameters defining the object's angular orientation relative to a reference coordinate system.

As used herein, the term "reference template" may refer to one or more images, image regions, feature maps, or other representations of expected vehicle appearance that serve as a basis for comparison with captured images during inspection, wherein the reference template may be derived from previous inspections of the same vehicle, from representative examples of similar vehicles, from computer-generated renderings, or from combinations thereof.

As used herein, the term "geometric transformation" may refer to a mathematical mapping that relates coordinates in one image or coordinate system to corresponding coordinates in another image or coordinate system, including but not limited to translation, rotation, scaling, affine transformations, perspective transformations, and non-rigid deformations.

The geometric transformation computation may employ a hierarchical approach: (1) initial pose estimation using, for example, PnP (Perspective-n-Point) algorithms with RANSAC outlier rejection, (2) refinement through, for example, Levenberg-Marquardt optimization minimizing reprojection error across detected feature correspondences, and (3) local non-rigid adjustment using, for example, thin-plate spline deformation to accommodate vehicle-specific variations from the reference template geometry.

As used herein, the term "similarity map" may refer to a multi-dimensional array of values quantifying the degree of correspondence, correlation, or similarity between a reference template and a captured image, wherein each location in the similarity map indicates how well the reference template matches the captured image at the corresponding spatial location.

As used herein, the term "deviation map" may refer to a representation derived from one or more similarity maps that indicates regions where captured images differ from expected appearance as defined by a reference template, wherein the deviation map may be generated by inverting similarity values, applying thresholds, computing statistical deviations, or performing other transformations that highlight anomalous regions.

As used herein, the term "defect" may refer to any anomaly, damage, deviation, or irregularity on a vehicle surface or component that differs from normal or expected appearance, including but not limited to scratches, dents, paint damage, corrosion, missing components, foreign objects, fluid leaks, misalignments, or other conditions of interest for vehicle inspection purposes.

As used herein, the term "three-dimensional reference model" may refer to a representation of vehicle geometry in three-dimensional space, including but not limited to computer-aided design models, mesh models, point clouds, voxel representations, parametric surface models, or any other data structure that encodes the shape and spatial extent of vehicle surfaces.

As used herein, the term "computer-aided design model" or "CAD model" may refer to a digital representation of vehicle geometry created using computer-aided design software, typically comprising precise mathematical definitions of surfaces, curves, and solid bodies that define the vehicle's shape, wherein such models are commonly maintained by vehicle manufacturers and suppliers as part of the engineering and manufacturing process.

As used herein, the term "projecting" or "projection" in the context of mapping two-dimensional image locations to three-dimensional space refers to the process of determining three-dimensional coordinates corresponding to two-dimensional image coordinates using camera calibration parameters, geometric models, and ray-casting or ray-surface intersection computations.

As used herein, the term "clustering" may refer to the computational process of grouping data points based on similarity or proximity criteria, wherein data points within a cluster are more similar to each other than to data points in different clusters, and wherein clustering may be performed using distance-based methods, density-based methods, hierarchical methods, or other algorithmic approaches known in the art.

As used herein, the term "camera pose" may refer to the position and orientation of a camera in three-dimensional space, typically represented by extrinsic calibration parameters that define the camera's location and viewing direction relative to a world coordinate system or object coordinate system.

As used herein, the term "reprojection error" may refer to the geometric distance between observed image feature locations and predicted image feature locations computed by projecting three-dimensional points through a camera model using estimated camera parameters, wherein minimization of reprojection error is commonly used as an optimization objective for camera calibration and pose estimation.

Referring now to the drawings, FIG. 1 may illustrate a vehicle inspection system 100 in accordance with some embodiments of the present invention. The system 100 comprises an imaging assembly 110 disposed around a vehicle inspection lane 105 through which vehicles pass during inspection. The imaging assembly 110 includes a plurality of cameras 112, 114, 116, 118 positioned at strategic locations to capture multi-view images of at least a portion of a vehicle 10 positioned within the inspection lane 105. In the illustrated embodiment, cameras 112 and 114 may be positioned on opposite lateral sides of the inspection lane 105 to capture side views of the vehicle 10, while cameras 116 and 118 may be positioned to capture front and rear views respectively. It will be understood that alternative embodiments may employ different numbers of cameras and different camera positioning arrangements depending on the desired coverage and application requirements. The cameras 112, 114, 116, 118 may comprise digital cameras with electronic image sensors such as, for example, charge-coupled device sensors or complementary metal-oxide-semiconductor sensors capable of capturing high-resolution color or monochrome images.

The system 100 further comprises one or more processors 120 communicatively coupled to the imaging assembly 110 to receive captured images therefrom. The processor 120 may comprise one or more general-purpose processors, graphics processing units, digital signal processors, field-programmable gate arrays, application-specific integrated circuits, or combinations thereof configured to execute software instructions and perform image processing operations. The processor 120 is configured to access memory 130 which stores program instructions and data including a template library 132 containing reference templates for multiple vehicles. The memory 130 may comprise random access memory, solid-state drives, hard disk drives, or other storage media in any combination.

The processor 120 is configured to retrieve a vehicle identifier of the vehicle 10 undergoing inspection. Vehicle identification may be performed using various techniques known in the art, including, for example, optical character recognition applied to license plate images, radio frequency identification tag reading, manual operator input, barcode or QR code scanning, or automated recognition of vehicle make and model from image analysis. Once the vehicle identifier is obtained, the processor 120 can retrieve vehicle-specific information from databases and associate inspection results with the particular vehicle 10 for tracking purposes.

The processor 120 is further configured to determine, from the multi-view images captured by cameras 112, 114, 116, 118, a spatial pose of the vehicle 10 relative to the imaging assembly 110. Determining the spatial pose enables the system to account for variations in how the vehicle 10 is positioned within the inspection lane 105 from one inspection to another. The spatial pose may be determined using various computer vision techniques such as, for example, detecting and localizing vehicle keypoints or feature points in the captured images, matching observed features to known vehicle geometry, or applying pose estimation algorithms that optimize the alignment between observed image features and expected feature locations for different hypothesized poses. The spatial pose information typically includes translation parameters indicating the vehicle's position along longitudinal, lateral, and vertical axes relative to a reference coordinate system, as well as rotation parameters indicating the vehicle's angular orientation about those axes.

With the vehicle identifier and spatial pose determined, the processor 120 retrieves from the template library 132 a reference template corresponding to the vehicle identifier. The reference template represents expected appearance of the vehicle 10 and serves as a comparison basis for defect detection. The template library 132 may store templates organized by vehicle identifier, such that each vehicle has an associated template derived from previous inspections of that specific vehicle. Alternatively or additionally, the template library 132 may store class templates corresponding to vehicle makes and models, such that vehicles of the same type share a common reference template. The structure and content of templates will be described in greater detail subsequently.

The processor 120 computes a geometric transformation that aligns the reference template to the determined spatial pose of the vehicle 10. This alignment step is essential because the vehicle 10 may be positioned differently in the inspection lane 105 compared to the position at which the reference template was originally captured or generated. The geometric transformation mathematically maps coordinates in the reference template space to coordinates in the captured image space, thereby enabling meaningful comparison despite differences in vehicle position and orientation. The geometric transformation may comprise a rigid transformation involving translation and rotation, an affine transformation that additionally accounts for scaling and shearing, or a more complex non-rigid transformation that can accommodate local deformations. The computation of the geometric transformation may be performed using optimization techniques that minimize a cost function measuring the dissimilarity between the transformed template and the captured images, or using feature-based alignment methods that establish correspondences between salient features in the template and captured images.

Once the reference template is properly aligned, the processor 120 computes, between the aligned reference template and the captured images, one or more spatially-registered similarity maps. A spatially-registered similarity map is a two-dimensional array of values where each location in the array corresponds to a spatial location on the vehicle 10 and the value at that location quantifies how similar the reference template is to the captured image at the corresponding location. Higher similarity values indicate good agreement between template and image, suggesting normal expected appearance, while lower similarity values indicate discrepancies that may represent defects or anomalies. The computation of similarity maps may employ various metrics and algorithms depending on the specific embodiment, as will be described in connection with dependent claims subsequently. The key aspect is that the similarity maps are spatially registered, meaning that each pixel or location in a similarity map corresponds to a defined location on the vehicle surface, enabling precise localization of any detected anomalies.

From the one or more similarity maps, the processor 120 generates a deviation map. The deviation map synthesizes information from potentially multiple similarity maps into a unified representation that highlights regions exhibiting significant deviation from expected appearance. Generation of the deviation map may involve inverting similarity values such that high deviation corresponds to low similarity, applying weighting coefficients to combine multiple similarity maps, applying statistical transformations that normalize deviations relative to expected variability, or other processing operations that produce a map where elevated values indicate likely defects. The deviation map provides a compact representation of where the vehicle 10 differs from the reference template and by how much.

A feature of the present embodiment may be a temporal comparison capability. The processor 120 compares the deviation map generated from the current inspection against deviation maps from prior inspections of the same vehicle 10 to distinguish persistent anomalies from transient conditions. This temporal comparison addresses a critical practical need in vehicle fleet management and damage liability assessment. Many apparent anomalies detected during a single inspection may be transient conditions such as dirt, water droplets, shadows, or temporary attachments like roof cargo carriers. These transient conditions are not actual damage and should not trigger alerts or liability determinations. Conversely, actual damage such as dents or scratches will persist across multiple inspections and can be reliably distinguished by examining temporal consistency. By comparing deviation maps over time, the processor 120 can classify each detected anomaly as persistent or transient based on whether it appears in multiple consecutive inspections. The comparison of deviation maps may utilize spatial registration to align maps from different inspections, correlation or overlap analysis to identify recurring anomalies in corresponding locations, and temporal filtering or tracking algorithms to follow anomalies over time.

Based on the deviation map analysis and temporal comparison, the processor 120 generates an inspection report identifying classified vehicle defects with spatial locations and severity scores. The inspection report presents the results of the inspection in a human-readable format suitable for display to operators, recording in databases, or transmission to external systems. Each identified defect in the report includes classification information indicating the defect type, spatial location information specifying where on the vehicle 10 the defect is located, and a severity score quantifying how significant the defect is. Spatial locations may be expressed as pixel coordinates in captured images, as coordinates in a vehicle-centric coordinate system, as references to predefined vehicle regions or zones, or in other suitable formats. Severity scores may be computed based on factors such as the magnitude of deviation observed in the deviation map, the spatial extent or area affected by the defect, measurements of depth or displacement if depth sensing capability is available, and the temporal persistence of the defect across multiple inspections. The inspection report enables informed decision-making regarding vehicle maintenance, damage liability, and quality control.

Optionally, the processor 120 is further configured to apply photometric normalization to at least one of the reference template and the captured images to compensate for illumination differences. Photometric normalization addresses the practical challenge that lighting conditions may vary between when the reference template was created and when current inspection images are captured. Variations in lighting intensity, color temperature, or directionality can cause appearance differences that are unrelated to actual defects but which would otherwise be flagged as anomalies in deviation maps. Photometric normalization techniques may adjust pixel intensity values to reduce the influence of illumination variations while preserving actual structural and geometric differences that correspond to real defects. Suitable photometric normalization methods may include, for example, histogram equalization or specification to match intensity distributions, scaling and offset adjustments to align mean and variance of intensity values, application of homomorphic filtering to separate illumination and reflectance components, or machine learning approaches that estimate and compensate for illumination differences. By applying photometric normalization, the system may achieve more robust defect detection that is less sensitive to environmental lighting variations.

Optionally, the one or more spatially-registered similarity maps computed by processor 120 include two or more of a deep-feature correlation map derived from convolutional neural network features, an edge-distance map computed from distance transforms of edge maps, and a photometrically-normalized intensity correlation map. This multi-map approach recognizes that different similarity metrics capture different aspects of image correspondence and that combining multiple complementary metrics yields more reliable defect detection than any single metric alone. The deep-feature correlation map may leverage the representational power of convolutional neural networks trained on large image datasets. Features extracted from intermediate layers of such networks capture hierarchical patterns ranging from low-level edges and textures to high-level semantic content. Computing correlation between deep features of the reference template and captured images produces a similarity map that may be robust to photometric variations and captures semantic similarity beyond simple pixel intensity matching. The edge-distance map focuses on geometric structure by computing edges in both the reference template and captured images, then measuring for each location how far the nearest edge in the captured image is from the nearest edge in the aligned template. Edge-based comparison may be particularly effective for detecting geometric deformations such as dents or misalignments that alter the structural boundaries of vehicle components. The photometrically-normalized intensity correlation map provides a baseline pixel-level similarity measure after compensating for illumination differences through normalization. By computing and combining these diverse similarity maps, the processor 120 may obtain a multi-dimensional characterization of appearance correspondence that is more reliable than single-metric approaches.

Optionally, the spatially-registered similarity maps further include a phase-only correlation map computed to capture structural similarity independent of intensity variations. Phase-only correlation may operate in the frequency domain and emphasize the phase spectrum while suppressing magnitude information. This characteristic makes phase-only correlation particularly robust to illumination changes and contrast variations that primarily affect magnitude spectra while leaving phase relationships relatively intact. The phase-only correlation map provides complementary information to intensity-based similarity measures and may enhance detection of structural changes even under challenging lighting conditions. Computing phase-only correlation typically involves applying Fourier transforms to image regions, normalizing the complex Fourier coefficients to unit magnitude to retain only phase information, computing the inverse Fourier transform of the normalized product, and using peak correlation values or correlation distributions as similarity measures. The inclusion of phase-only correlation among the suite of similarity maps may further strengthen the system's robustness and detection reliability.

Optionally, the reference template retrieved by processor 120 is a per-vehicle template associated with the vehicle identifier, and the processor 120 is further configured to update the per-vehicle template by incorporating regions confirmed as normal and excluding regions confirmed as defective. This adaptive learning capability represents a significant advancement over static template approaches. When an inspection is completed and defect classifications are validated, either through operator review or through automated confidence assessment, the processor 120 may update the per-vehicle template to reflect confirmed knowledge about which regions exhibit normal appearance for this specific vehicle and which regions contain defects. Regions confirmed as normal may be incorporated into the template, meaning their appearance in the current inspection is used to update or reinforce the expected normal appearance stored in the template. Regions confirmed as defective may be excluded from the template to prevent them from becoming part of the expected normal appearance. Over time, this update process may cause the per-vehicle template to evolve into an increasingly accurate representation of the vehicle's legitimate condition, reducing false positives caused by vehicle-specific variations while maintaining sensitivity to new damage. The update process may employ weighted averaging to gradually incorporate new information, spatial segmentation to update templates on a region-by-region basis, or more sophisticated machine learning techniques to optimize template evolution based on inspection outcomes.

Optionally, the processor 120 is configured to initialize the per-vehicle template at a first inspection visit and evolve the per-vehicle template across subsequent inspections using gated learning based on inspection outcomes. When a vehicle undergoes its first inspection by the system 100, no pre-existing per-vehicle template exists. The processor 120 may initialize a new per-vehicle template for this vehicle using images captured during the first inspection, potentially augmented by a class template for vehicles of the same type to provide reasonable initial expectations. During subsequent inspections, the template may undergo evolution through gated learning. Gated learning means that template updates are conditional on validation of inspection outcomes. If an inspection produces results that are confirmed as accurate, either through automated confidence scoring or through operator validation, the gating mechanism allows the template to be updated with information from that inspection. Conversely, if an inspection produces questionable results or if validation indicates errors, the gating mechanism blocks template updates to prevent incorporation of incorrect information. This gated approach may ensure that the per-vehicle template evolves toward increasing accuracy while remaining protected against contamination by erroneous data. The initialization and evolution process enables the system to build and refine vehicle-specific knowledge over time, starting from zero prior information and converging toward highly personalized templates that reflect each vehicle's unique characteristics.

Optionally, the template library 132 includes both a per-vehicle template specific to the vehicle identifier and a class template derived from fleet-level statistical aggregation of multiple vehicles of a same class, and the processor 120 weights evidence from the per-vehicle template and the class template using learned uncertainty weights. This dual-template approach combines the benefits of vehicle-specific personalization with the statistical robustness of fleet-level information. The per-vehicle template captures unique characteristics of the individual vehicle 10, such as aftermarket modifications, legitimate variations in factory equipment, or custom features. The class template represents typical appearance and normal variability for all vehicles of the same make, model, and configuration, derived by statistically aggregating information from many vehicles in the fleet. By maintaining both template types and weighting their contributions, the system may achieve superior performance compared to using either template alone. The learned uncertainty weights determine how much influence each template type has on the final deviation map and defect detection decisions. These weights may be learned through machine learning optimization processes that minimize detection errors on validation datasets, or they may be computed adaptively based on factors such as how many inspections the per-vehicle template is based upon, with greater weight given to class templates for vehicles with limited inspection history and greater weight given to per-vehicle templates for vehicles with extensive inspection history. The weighted combination allows the system to leverage statistical knowledge from the fleet while still personalizing detection for each vehicle's specific characteristics.

Optionally, the processor 120 applies region-specific adaptive thresholds to the deviation map based on fleet-level variance priors that encode expected variability for corresponding regions of the vehicle class. This feature recognizes that different regions of a vehicle exhibit different levels of normal variability. For example, regions near wheel wells typically show high variability due to accumulation of road debris, mud, and salt, while regions on the hood or roof typically exhibit lower variability. Applying a uniform threshold across the entire deviation map would result in excessive false positives in high-variability regions or missed detections in low-variability regions. The processor 120 may address this by retrieving fleet-level variance priors from memory 130, wherein these priors encode statistical information about expected variability in each region based on observations across many vehicles of the same class. The variance priors may be represented as a spatial map indicating variance levels across vehicle regions, or as a set of region-specific variance values for predefined zones. The processor 120 may use these variance priors to compute adaptive thresholds that are higher in regions where normal variability is high and lower in regions where normal variability is low. By comparing deviation map values against these adaptive thresholds rather than uniform thresholds, the system may achieve more accurate defect detection that accounts for inherent variability patterns.

Optionally, the fleet-level variance priors maintained in memory 130 include seasonal priors that modulate expected variance based on time of year and geographic region to account for weather-related conditions. Vehicles in winter conditions accumulate snow, ice, and road salt, leading to increased appearance variability particularly in lower regions and wheel wells. Vehicles in rainy seasons exhibit water droplets and splash patterns. Vehicles in certain geographic regions may be more prone to dust accumulation or specific types of environmental exposure. The processor 120 may access seasonal priors that incorporate this temporal and geographic information, adjusting variance expectations and corresponding adaptive thresholds based on current date, season, and geographic location of the inspection facility. This seasonal adaptation may further reduce false positives during conditions that naturally cause increased appearance variability while maintaining detection sensitivity during conditions where clean vehicle appearance is expected. The seasonal priors may be learned through statistical analysis of inspection data collected over multiple years and across different geographic locations, identifying patterns in how appearance variability correlates with temporal and environmental factors.

Optionally, retrieving the reference template from template library 132 comprises synthesizing the reference template through computer rendering. Specifically, the processor 120 may access a three-dimensional vehicle model corresponding to the vehicle identifier, wherein this three-dimensional model may comprise a computer-aided design model, a mesh model generated from photogrammetry, or other three-dimensional representations. The processor 120 may render the three-dimensional vehicle model under illumination conditions estimated from the captured images to produce rendered images that match expected lighting characteristics. The rendering process may employ ray tracing, rasterization, or other computer graphics techniques to generate photorealistic images of the vehicle model. The processor 120 may project the rendered model to viewpoints corresponding to the plurality of cameras 112, 114, 116, 118, meaning that separate rendered images are generated for each camera's perspective based on that camera's known position and viewing direction. The rendered images from multiple viewpoints collectively constitute the reference template used for comparison against captured images. This synthesis approach has several advantages. First, it eliminates the need to store large numbers of pre-captured template images for every vehicle type and viewpoint combination. Second, it ensures perfect geometric alignment with the determined spatial pose of the vehicle 10 since rendering can be performed at arbitrary poses without requiring stored templates captured at those exact poses. Third, it enables compensation for current lighting conditions by estimating illumination parameters from captured images and rendering the model under matching illumination. The illumination estimation may be performed by analyzing ambient light color and intensity in captured images, detecting light source directions and types, or using machine learning models trained to predict lighting parameters from images. The synthesized reference template provides an ideal baseline for comparison that is geometrically accurate and photometrically adapted to current conditions.

Optionally, the imaging assembly 110 includes polarization-controlled imaging sensors among the plurality of cameras. These polarization-controlled sensors may comprise cameras equipped with polarizing filters that can be oriented at different angles, cameras with pixelated polarization filter arrays similar to Bayer color filter arrays but encoding polarization states rather than color channels, or cameras preceded by tunable polarization elements such as liquid crystal polarization rotators. The processor 120 may be configured to separate diffuse and specular reflection components from the captured images using the polarization information. This separation exploits the physical principle that diffuse reflections are generally unpolarized while specular reflections are partially polarized. By capturing images at multiple polarization angles and applying polarization analysis algorithms, the processor 120 can decompose each captured image into a diffuse reflection component representing light scattered by the vehicle surface and a specular reflection component representing mirror-like reflections from the surface. The processor 120 may then compute a first similarity map on the diffuse reflection components to detect color and texture anomalies, since diffuse reflections carry information about surface material properties, paint color, and texture patterns. The processor 120 may additionally compute a second similarity map on the specular reflection patterns to detect surface geometry deviations, since specular reflection patterns are highly sensitive to surface shape and any geometric irregularities such as dents will manifest as distortions in specular patterns. By separately analyzing diffuse and specular components, the system may gain additional discriminative power to detect different types of defects through their different impacts on polarization characteristics.

Optionally, the imaging assembly 110 incorporates precision mounting hardware designed for industrial vehicle inspection environments. Each camera 112, 114, 116, 118 may be mounted using vibration-damping brackets fabricated from, for example, aircraft-grade aluminum alloy, providing mechanical stability under operational conditions including vehicle movement and facility vibrations. The mounting system may maintain camera positions within spatial tolerances of, for example, ±2 mm and angular tolerances of, for example, ±0.1 degrees over extended operational periods, ensuring consistent geometric relationships necessary for accurate three-dimensional projection operations. Environmental protection enclosures may house each camera assembly, constructed from, for example, polycarbonate materials with anti-reflective optical windows positioned to minimize interference with image capture while providing protection from dust, moisture, and temperature variations. Integrated LED illumination arrays may operate at, for example, 5000K color temperature with uniform intensity distribution, providing consistent lighting conditions that reduce photometric variations between inspections conducted at different times of day or under varying ambient lighting conditions.

Optionally, the plurality of cameras includes undercarriage imaging sensors positioned beneath the inspection lane 105 or alongside the inspection lane at low mounting heights configured to view the vehicle underside. Undercarriage inspection may be important for detecting issues such as missing heat shields, exhaust system damage, fluid leaks, or attached foreign objects. The processor 120 may be configured to register sequential undercarriage frames captured as the vehicle 10 moves through the inspection lane 105. As the vehicle moves, the undercarriage cameras capture a sequence of overlapping frames viewing different portions of the undercarriage. The processor 120 may apply image registration techniques to align these sequential frames, compensating for vehicle motion and perspective effects. The processor 120 may construct an undercarriage panorama in a vehicle-centric coordinate frame by stitching or mosaicking the registered frames into a comprehensive view of the entire undercarriage. This panorama provides a complete representation of undercarriage appearance despite each individual camera having a limited field of view. The processor 120 may compare the undercarriage panorama to an undercarriage reference template stored in template library 132 and detect at least one of missing components, foreign objects, loose components, and fluid leaks based on deviations identified in the comparison. Missing components may be detected as regions where expected components visible in the reference template are absent in the panorama. Foreign objects may be detected as additional elements present in the panorama but not in the reference template. Loose components may be identified through detection of positional deviations where components have moved from their expected locations. Fluid leaks may be identified through detection of wet areas or drip patterns on undercarriage surfaces. The undercarriage inspection capability may enhance the comprehensiveness of the system by extending coverage to the vehicle undersurface.

Optionally, the processor 120 is further configured to implement exemplar-based defect detection that enables rapid adaptation to new defect types without requiring extensive retraining of detection models. The processor 120 may receive one or more exemplar image patches depicting a target defect type. These exemplar patches may be provided by an operator selecting regions of interest in previously inspected images that show examples of a particular defect type, or they may be automatically mined from inspection databases as will be described below. Each exemplar patch contains a visual example of what a particular type of defect looks like. The processor 120 may compute exemplar-conditioned correlation between features of the exemplar image patches and features of the captured images. This correlation process may involve extracting feature representations from both the exemplar patches and from the captured images, then computing similarity or correlation measures between exemplar features and features at each spatial location in the captured images. The feature extraction may employ convolutional neural network feature extractors, hand-crafted features such as histogram of oriented gradients or scale-invariant feature transform descriptors, or other feature representations. The result is a spatial correlation map indicating where in the captured images the system finds regions that are similar to the exemplar. The processor 120 may then perform bounding-box regression conditioned on the exemplar-conditioned correlation to detect instances of the target defect type. Bounding-box regression refines the coarse localization provided by the correlation map into precise rectangular regions enclosing detected defects. The conditioning on exemplar-conditioned correlation means that the regression process is specifically tuned to localize defects similar to the provided exemplars. This exemplar-based approach enables detection of new defect types without retraining a detection model, since the system can adapt to new defect categories simply by being shown a few examples rather than requiring collection of large training datasets and computationally expensive model retraining.

Optionally, the one or more exemplar image patches used for exemplar-based detection are automatically mined from confirmed defects in prior inspections of a fleet of vehicles. The processor 120 may access a database of historical inspection records stored in memory 130, identifying inspections where defects were detected and subsequently confirmed as accurate detections. From these confirmed defects, the processor 120 may extract image patches showing the defect appearance from various viewpoints and under various conditions. The processor 120 may apply clustering or grouping algorithms to organize extracted patches by defect type based on visual similarity, creating libraries of exemplar patches for each defect category. When an operator wishes to detect a particular defect type, the processor 120 may retrieve representative exemplar patches for that type from the automatically constructed library. This automated mining process eliminates manual effort in creating exemplar sets and ensures that exemplars represent realistic defect appearances as actually encountered in operational conditions rather than idealized or synthetic examples. As the system accumulates more inspection data over time, the exemplar libraries grow and diversify, improving the coverage and robustness of exemplar-based detection.

Optionally, the computation of the geometric transformation that aligns the reference template to the determined spatial pose comprises a multi-stage refinement process. The processor 120 may first compute a coarse translational alignment using phase-only correlation. Phase-only correlation is computationally efficient and robust to intensity variations, making it well-suited for quickly establishing an approximate alignment by determining the translation offset between template and image. The processor 120 may then refine the coarse alignment to an affine transformation using enhanced correlation coefficient optimization. The affine transformation adds rotation, scaling, and shearing parameters beyond simple translation, allowing compensation for more complex pose differences. Enhanced correlation coefficient is a similarity metric that may be optimized through iterative adjustment of transformation parameters to maximize correlation between the transformed template and captured image. Finally, the processor 120 may apply local non-rigid refinement to accommodate vehicle deformations. Vehicles are not perfectly rigid bodies and may exhibit local deformations due to suspension compression, tire deflation, open doors, flexible body panels, or other factors. The non-rigid refinement allows different regions of the template to undergo locally varying transformations, enabling precise alignment even in the presence of deformations. The non-rigid refinement may employ techniques such as, for example, thin-plate splines, deformable mesh models, or optical flow to compute spatially varying displacement fields. This multi-stage progression from coarse global alignment to fine local refinement may achieve accurate template alignment under diverse conditions.

Optionally, the imaging assembly 110 further includes at least one depth sensor in addition to the cameras 112, 114, 116, 118. The depth sensor may comprise structured light projectors and cameras that measure depth by analyzing patterns projected onto the vehicle surface, time-of-flight sensors that measure depth by timing the round-trip travel of light pulses, stereo camera pairs that measure depth through triangulation, or lidar systems that measure depth through laser scanning. The processor 120 may be configured to back-project candidate defect regions to three-dimensional space using depth data from the depth sensor and camera calibration parameters. Back-projection converts two-dimensional image coordinates into three-dimensional spatial coordinates by combining the two-dimensional location with the measured depth value and applying the inverse of the camera projection transformation. For each candidate defect identified in any camera view, the processor 120 may compute the three-dimensional location of that defect. The processor 120 may then require corroboration of a defect from multiple camera viewpoints based on epipolar geometry before classifying the detection as a confirmed defect. Epipolar geometry provides mathematical constraints relating how the same three-dimensional point appears in different camera views. If a true physical defect exists at a computed three-dimensional location, it should be visible in other camera views at image locations consistent with epipolar constraints. The processor 120 may verify whether candidate defects detected in one view have corresponding detections in other views at the predicted epipolar locations. Only defects that receive such multi-view corroboration may be classified as confirmed defects. This epipolar corroboration requirement may significantly reduce false positives by rejecting artifacts that appear in only a single view due to noise, reflections, or image processing errors. True physical defects are inherently visible from multiple viewpoints and thus pass the corroboration test.

Optionally, the processor 120 computes severity scores for detected defects based on at least one of depth or displacement magnitude measured from the depth sensor, affected surface area, temporal persistence across multiple inspections, and deviation magnitude in the deviation map. The severity score quantifies how significant each defect is, enabling prioritization and risk assessment. Depth or displacement magnitude indicates how deeply a dent is indented or how far a protruding object extends, with larger displacements corresponding to more severe damage. The depth measurement may be obtained directly from the depth sensor for defects where depth data is available. Affected surface area quantifies the spatial extent of the defect, with larger defects generally being more severe than smaller defects of the same type. The processor 120 may compute affected area by measuring the region over which deviation values exceed thresholds or over which abnormal depth measurements persist. Temporal persistence quantifies how long the defect has been present by examining how many consecutive inspections show the defect at the same location. Defects that persist over many inspections may be assigned higher severity scores than transient anomalies. Deviation magnitude from the deviation map quantifies the degree to which the defect region deviates from expected appearance, with larger deviations typically indicating more obvious or severe damage. The processor 120 may combine these multiple factors into an overall severity score using weighted sums, trained regression models, or decision tree algorithms calibrated on expert assessments of defect severity. The resulting severity scores enable generation of prioritized defect lists in the inspection report, with the most severe defects highlighted for immediate attention.

Optionally, retrieving the reference template from template library 132 comprises obtaining a three-dimensional CAD model of the vehicle 10 and using that model to generate the reference template through rendering. The processor 120 may obtain the three-dimensional CAD model from a CAD model database stored in memory 130 or accessed through network connection to external databases maintained by vehicle manufacturers or third-party providers. The CAD model is indexed by vehicle identifier such that the appropriate model for vehicle 10 is retrieved. The processor 120 may determine camera poses of the plurality of cameras 112, 114, 116, 118 relative to the CAD model. This determination establishes the geometric relationship between the three-dimensional CAD model coordinate system and each camera's coordinate system, including translation vectors and rotation matrices defining where each camera is located and oriented relative to the model. Camera pose determination may be performed by detecting and localizing features visible in both the captured images and the CAD model, then solving for the camera transformation parameters that align observed features with model features, a process sometimes termed perspective-n-point solving or model-based pose estimation. The processor 120 may render the CAD model from viewpoints corresponding to the plurality of cameras, generating a separate rendered image for each camera showing what the CAD model would look like when viewed from that camera's position and orientation. The rendering may incorporate estimated lighting conditions to produce photorealistic rendered images that match expected appearance under current illumination. The processor 120 may generate the reference template from the rendered views, with the rendered images serving as the template against which captured images are compared. This CAD-based template synthesis approach leverages the high-fidelity geometric information contained in manufacturer CAD models to produce accurate reference templates without requiring storage of extensive image libraries. The rendered templates inherently have correct geometry and can be generated on demand for any vehicle pose and camera configuration.

Optionally, the three-dimensional CAD model integration enables precise geometric correspondence between two-dimensional image observations and three-dimensional vehicle surface locations through mathematically rigorous projection operations. Ray-casting algorithms may compute intersection points between image observation rays and CAD model surface meshes using accelerated spatial indexing structures including, for example, octree or binary space partitioning trees that reduce computational complexity from O(n) to O(log n) for intersection queries against meshes containing hundreds of thousands of triangular faces. The geometric accuracy of CAD-based projection may achieve sub-millimeter spatial precision when camera calibration parameters are maintained within specified tolerances, enabling reliable correspondence tracking across multiple inspection visits even when vehicles are positioned differently in the inspection lane. Geodesic distance computations along mesh surfaces may account for the three-dimensional topology of vehicle surfaces, ensuring that clustering operations properly handle surface connectivity and avoid incorrectly grouping defects that are geometrically close in Euclidean distance but separated by body panel boundaries or geometric discontinuities.

Optionally, the processor 120 is further configured to perform cross-system comparison of inspection data obtained from different inspection systems. The processor 120 may obtain a first inspection dataset from a mobile inspection system, which may comprise a portable or vehicle-mounted inspection system that can be deployed at different locations. Mobile inspection systems may be useful for inspecting vehicles at remote sites or at customer locations where fixed inspection stations are not available. The processor 120 may obtain a second inspection dataset from a fixed-position inspection system such as the system 100 installed at a permanent facility. Each inspection dataset includes detected defect locations and associated information. However, defect locations from the two systems may be expressed in different coordinate systems or with different spatial references, making direct comparison difficult. The processor 120 may align defect locations from both datasets onto a common three-dimensional reference model, which may comprise a CAD model or a reconstructed three-dimensional model of the vehicle. The alignment process maps defect coordinates from each system's native coordinate representation onto corresponding locations on the shared three-dimensional model, enabling meaningful spatial correspondence. The processor 120 may then compare defects detected in the first and second inspection datasets using the aligned defect locations on the reference model. This comparison can identify defects detected by both systems versus defects detected by only one system, assess consistency of defect localization between systems, and reconcile potential discrepancies. The cross-system comparison capability enables quality assurance, cross-validation of detection results, and integration of data from heterogeneous inspection systems into unified vehicle condition reports. For example, a vehicle may undergo initial inspection at a fixed station to establish baseline condition, then undergo periodic inspections by mobile systems during service operations, with defect tracking maintained consistently across all systems through alignment on the common reference model.

Figure 2:
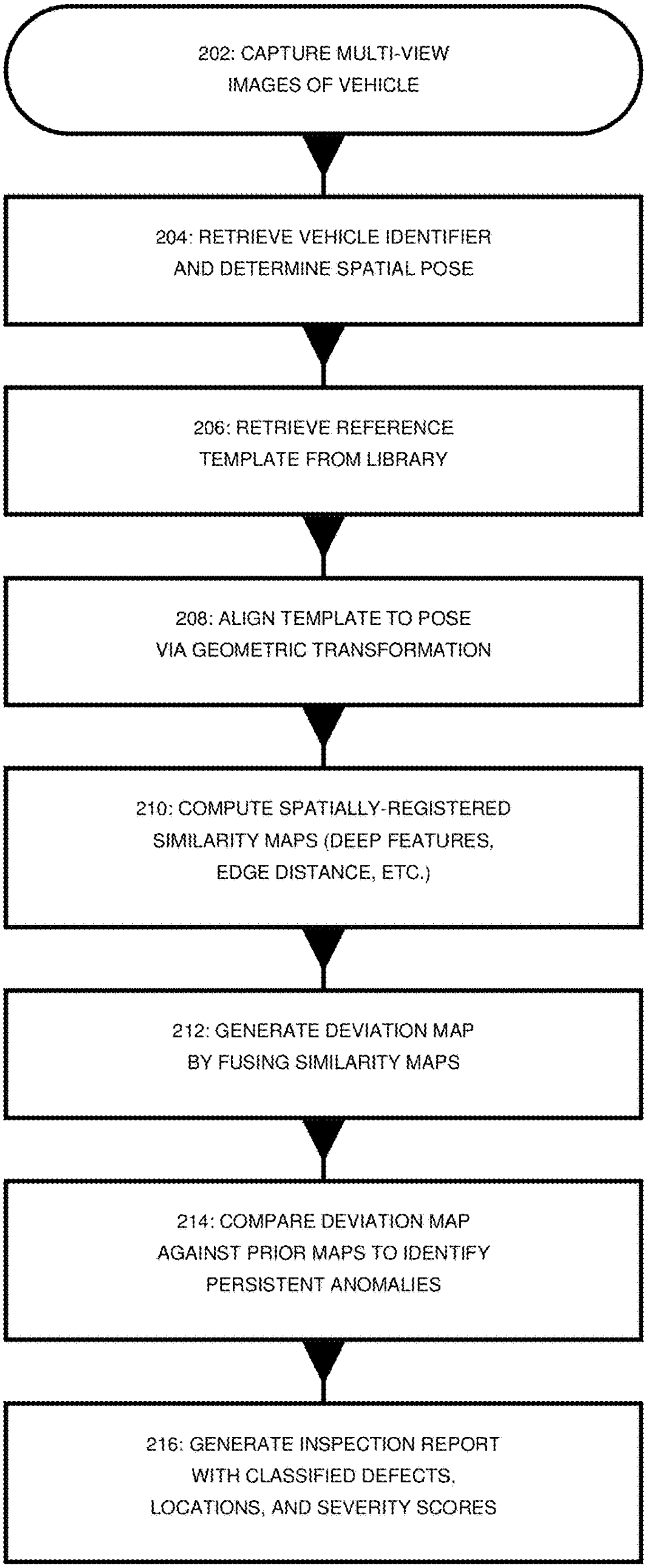
FIG. 2 is a flowchart depicting a method for automated vehicle inspection using template-based defect detection and temporal comparison in accordance with an embodiment of the invention.

Turning now also to FIG. 2, which is a flowchart depicting a method 200 for automated vehicle inspection in accordance with another embodiment of the invention. The method 200 may optionally be implemented using the system 100 depicted in FIG. 1, with the steps of method 200 performed by processor 120 executing program instructions stored in memory 130. At step 202, multi-view images of a vehicle are captured by an imaging assembly, such as imaging assembly 110 comprising cameras 112, 114, 116, 118. The multi-view images provide coverage of the vehicle from multiple different angles and perspectives.

At step 204, a vehicle identifier is retrieved and a spatial pose of the vehicle is determined. The vehicle identifier may be retrieved through automated license plate recognition, RFID reading, barcode scanning, operator input, or other identification mechanisms. The spatial pose is determined from the multi-view images through computer vision techniques such as feature detection and pose estimation algorithms that analyze the vehicle's position and orientation relative to the imaging assembly.

At step 206, a reference template corresponding to the vehicle identifier is retrieved from a template library. The reference template represents expected appearance for the vehicle and serves as a comparison basis for defect detection. The template may be vehicle-specific, class-based, or a combination thereof, as described previously.

At step 208, the reference template is aligned to the determined spatial pose by computing a geometric transformation. The geometric transformation compensates for differences between the vehicle pose at the time the template was created or generated and the current pose determined in step 204. The alignment ensures that template and captured images are in spatial correspondence for meaningful comparison.

At step 210, a plurality of spatially-registered similarity maps are computed between the aligned reference template and the captured images. The similarity maps quantify correspondence between template and images at each spatial location. The plurality of similarity maps may include at least a deep-feature correlation map derived from convolutional neural network features and an edge-distance map computed from edge detection and distance transform operations. Additional similarity maps such as phase-only correlation maps or photometrically-normalized intensity correlation maps may also be computed. Each similarity map captures different aspects of image correspondence, with deep features representing high-level semantic similarity, edge distances representing geometric structure similarity, and other metrics providing complementary information.

At step 212, a deviation map is generated by fusing the plurality of similarity maps. The fusion process combines information from multiple similarity maps into a unified representation highlighting regions that deviate from expected appearance. Fusion may employ weighted averaging with weights that reflect the relative reliability or importance of each similarity map, machine learning models trained to optimally combine similarity maps for defect detection, or other fusion strategies. The resulting deviation map provides a comprehensive assessment of appearance deviations incorporating evidence from multiple complementary similarity metrics.

At step 214, the deviation map is compared against prior deviation maps from previous inspections of the vehicle to identify persistent anomalies. Deviation maps from historical inspections are retrieved from memory, aligned to the current deviation map through spatial registration, and analyzed to determine which anomalies appear consistently across multiple inspections. Persistent anomalies that recur in the same spatial locations over time are classified as likely representing true defects, while transient anomalies that appear in only one or few inspections are classified as potentially representing non-defect conditions such as dirt or temporary environmental conditions. The temporal comparison provides crucial context for distinguishing actual damage requiring attention from benign variations.

At step 216, an inspection report is generated with classified defects, spatial locations, and optionally severity scores. The classified defects represent persistent anomalies identified through the temporal comparison, each classified according to defect type through analysis of deviation patterns, similarity map characteristics, or application of trained classification models. Spatial locations specify where each defect is located on the vehicle, expressed in suitable coordinates. Severity scores may quantify the significance of each defect based on deviation magnitude, spatial extent, temporal persistence, or other factors as described previously. The inspection report presents the final inspection results in a format suitable for operator review, database storage, or integration with fleet management systems. Optionally, instructions may be generated for adapting an interactive UI with classified defects, optionally the spatial locations, and optionally the severity scores. Optionally, instructions may be generated for transmitting an alert based on the classified defects, optionally the spatial locations, and optionally the severity scores. The alert may be sent by a message or an email.

Optionally, temporal defect tracking capability may be set to address critical practical requirements in rental vehicle operations and fleet management applications where damage liability determination and maintenance scheduling depend on accurate differentiation between pre-existing and newly-occurred damage. The system may maintain persistent vehicle inspection records indexed by vehicle identifier, with each record containing three-dimensional defect locations spatially registered to CAD model coordinates that remain consistent across inspection visits regardless of vehicle positioning variations. Temporal comparison algorithms may analyze defect persistence patterns over configurable time windows, typically spanning, for example, 1 to 90 days for rental vehicle applications, to distinguish systematic damage progression requiring maintenance intervention from isolated damage events requiring liability assessment. The spatial consistency provided by CAD model-based localization may enable detection of defect migration patterns, such as paint damage spreading from initial impact points or structural deformation affecting adjacent body panels, supporting proactive maintenance scheduling based on damage evolution trends rather than reactive maintenance triggered by failure events.

Optionally, the method 200 further comprises updating the reference template based on confirmed inspection outcomes. After an inspection report is generated and reviewed, inspection outcomes are confirmed through operator validation or through automated confidence assessment. For regions confirmed as defect-free, meaning the inspection correctly identified those regions as normal, the appearance of those regions in the current inspection may be incorporated into the reference template. This incorporation may involve updating pixel values or feature representations in the template to reflect the confirmed normal appearance, using weighted averaging or other update rules to progressively refine the template. For regions confirmed as defective, meaning the inspection correctly identified actual defects in those regions, those regions may be excluded from the reference template to prevent defect appearance from being incorporated into the expected normal appearance. Over multiple inspections of the vehicle, the reference template may evolve through this gated learning process, wherein updates are conditioned on confirmed outcomes. The evolving reference template is a per-vehicle template specific to the vehicle identifier, meaning each vehicle has its own template that personalizes over time to reflect that vehicle's unique characteristics. The template evolution improves accuracy by adapting to legitimate vehicle-specific variations while maintaining sensitivity to new defects.

Optionally, the method 200 further comprises exemplar-based detection of specific defect types. One or more exemplar patches depicting a specific defect type may be received, either through operator selection of example regions in previously inspected images or through automated mining from confirmed defect databases. Spatial correlation may be computed between features extracted from the exemplar patches and features extracted from the captured images. The feature extraction may employ convolutional neural networks, hand-crafted descriptors, or other feature representations. The spatial correlation computation produces correlation maps indicating where in the captured images there exist regions with similar appearance to the exemplar patches. Additional instances of the specific defect type may be localized using template-conditioned regression based on the spatial correlation. The regression process refines the coarse localization provided by correlation maps into precise bounding boxes enclosing detected defect instances. The conditioning on exemplars means that the regression is specialized for detecting the appearance patterns characteristic of the specific defect type shown in the exemplars. This approach enables detection of new defect types without retraining a detection model, since the system adapts to new categories simply through provision of exemplar patches rather than requiring collection of extensive training datasets and model retraining. The exemplar-based detection may enhance system flexibility and reduce deployment barriers associated with training-based approaches.

Figure 3A:
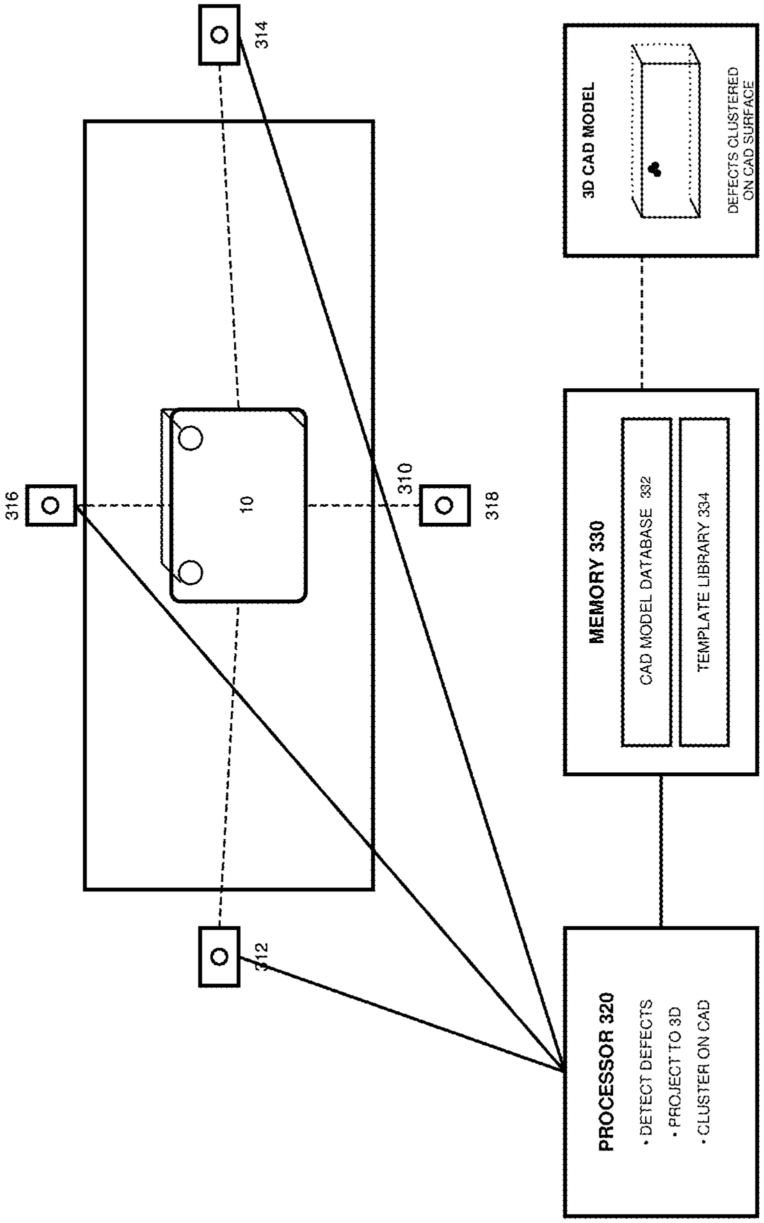
FIG. 3A is a schematic diagram of a vehicle inspection system emphasizing three-dimensional spatial clustering for multi-view defect consolidation in accordance with another embodiment of the invention.

Turning now to FIG. 3A, there is illustrated a vehicle inspection system 300 in accordance with another embodiment of the present invention that emphasizes three-dimensional spatial clustering for multi-view defect consolidation. System 300 shares certain components with system 100, and like reference numerals indicate like elements where appropriate. System 300 comprises a multi-camera array 310 positioned to capture images of a vehicle 10 from multiple viewpoints. The multi-camera array 310 includes cameras 312, 314, 316, 318 deployed at different locations around the vehicle 10, providing comprehensive coverage from diverse angles including side views, front view, rear view, top view, and potentially bottom view. The number and positioning of cameras may be selected based on application requirements, with more cameras providing more complete coverage and greater redundancy at the cost of increased system complexity and data processing requirements.

Optionally, deployment configurations may address practical requirements for vehicle inspection at distributed locations including customer facilities, remote fleet operations, and temporary inspection stations where permanent infrastructure installation is impractical. Portable mounting systems may employ modular aluminum frame structures with quick-connect coupling mechanisms enabling trained operators to establish calibrated multi-camera arrays within, for example, 30 minutes at new locations. Battery power systems may incorporate lithium-ion battery packs with integrated power management circuits providing at least, for example, 8 hours of continuous operation under normal inspection loads, with power consumption optimized through dynamic processing load balancing and selective camera activation based on vehicle presence detection. Optionally, wireless communication modules operating on cellular or WiFi networks may enable real-time data transmission to central processing servers, supporting distributed inspection operations where local processing resources may be limited while maintaining centralized data management and quality assurance oversight. Environmental rating specifications may ensure reliable operation across temperature ranges from, for example, −20° C. to +60° C. and humidity levels up to, for example, 95% non-condensing, accommodating outdoor deployment in diverse geographic and climatic conditions.

System 300 further comprises one or more processors 320 communicatively coupled to the multi-camera array 310 to receive captured images. Processor 320 may comprise similar hardware to processor 120, including general-purpose processors, graphics processors, or specialized processing units configured to execute program instructions and perform image processing and geometric computations. Processor 320 accesses memory 330 which stores program instructions and data including a CAD model database 332 containing three-dimensional computer-aided design models for multiple vehicle types and a template library 334 containing reference templates similar to template library 132.

The processor 320 is configured to retrieve a reference template and a three-dimensional CAD model corresponding to the vehicle 10. The reference template is retrieved from template library 334 based on the vehicle identifier, as described previously in connection with system 100. The three-dimensional CAD model is retrieved from CAD model database 332, likewise indexed by vehicle identifier. The CAD model provides high-fidelity geometric information describing the shape, dimensions, and surface characteristics of the vehicle 10. CAD models may be typically created by vehicle manufacturers during the design process and contain precise mathematical representations of every body panel, component, and feature of the vehicle. These models may be represented as polygon meshes, non-uniform rational basis spline surfaces, constructive solid geometry representations, or other geometric data structures common in computer-aided design systems.

The processor 320 may detect defects by comparing the captured images to the reference template using techniques analogous to those described for system 100. Specifically, the processor 320 may align the template to the captured images through geometric transformation, compute spatially-registered similarity maps between aligned template and images, generate deviation maps highlighting regions of significant dissimilarity, and identify candidate defects as regions exhibiting deviation beyond thresholds. The defect detection process produces a set of defect detections, each characterized by a two-dimensional location in a particular camera image and associated metadata such as deviation magnitude, defect classification, or confidence score.

A key distinguishing feature of system 300 may be the subsequent three-dimensional processing performed by processor 320. After detecting defects in two-dimensional images, processor 320 projects detected defects from two-dimensional image locations onto the three-dimensional CAD model. This projection process may involve determining, for each two-dimensional defect location in an image, the corresponding three-dimensional location on the CAD model surface that projects to that image location when viewed from the camera that captured the image. The projection computation may require knowledge of camera poses relative to the CAD model, which may be determined through calibration procedures or through runtime pose estimation techniques as will be described subsequently. Given a two-dimensional image point and known camera pose, processor 320 may compute a ray extending from the camera center through the image point into three-dimensional space. The intersection of this ray with the CAD model surface defines the three-dimensional location of the defect. Ray-surface intersection may be computed using ray tracing algorithms, ray-mesh intersection tests, or other computational geometry techniques. The result of projecting all defect detections is a set of three-dimensional point locations on the CAD model surface, each representing a detected defect.

The processor 320 may then cluster the projected defects on the CAD model to consolidate redundant detections from different viewpoints. Clustering may be necessary because the same physical defect on the vehicle is often visible from multiple cameras and thus generates multiple detections at nearby three-dimensional locations. Without clustering, the inspection report would list the same defect multiple times, confusing operators and inflating defect counts. The processor 320 may apply clustering algorithms to group three-dimensional defect locations based on spatial proximity. Defect locations that are within a threshold distance of each other on the CAD model surface may be grouped into the same cluster, with each cluster representing a unique physical defect. The clustering may employ various algorithms such as density-based spatial clustering that groups nearby points while identifying outliers, hierarchical clustering that builds a tree of nested clusters, or connected components analysis that groups points within a specified distance threshold. An important consideration may be that distance should be measured along the CAD model surface rather than through Euclidean distance in three-dimensional space, since defects on opposite sides of a body panel may be close in Euclidean distance but far apart along the surface. The processor 320 may compute geodesic distances along the surface mesh or use graph-based distance metrics on the mesh to properly account for surface topology.

After clustering, processor 320 may generate an inspection report with consolidated defect locations. Each cluster identified through the clustering process corresponds to a single physical defect, and the inspection report lists each defect once rather than multiple times. The consolidated defect location for each cluster may be computed as the centroid of the three-dimensional locations in that cluster, as the location with highest confidence score, or using other aggregation rules. The inspection report presents defect information in a clear, unambiguous format that accurately reflects the number and locations of unique physical defects on the vehicle 10. This consolidated reporting may eliminate confusion caused by redundant multi-view detections and provides operators with actionable inspection results.

The integration of template-based detection with three-dimensional clustering in system 300 may combine the strengths of both approaches. Template comparison provides sensitive detection of appearance anomalies in two-dimensional images, leveraging rich photometric information and learned statistical models. Three-dimensional clustering using CAD geometry provides accurate consolidation and localization of detected anomalies in three-dimensional space, leveraging precise geometric knowledge about vehicle shape. The combination may achieve superior performance compared to using either approach in isolation.

In optional embodiments, which may be implemented in connection with system 300 or system 100 when augmented with CAD model capabilities, the processor 320 is further configured to track defect locations on the CAD model across multiple inspections of multiple vehicles and to generate aggregate defect statistics. Specifically, the processor 320 may track defect locations on the CAD model across multiple inspections of multiple vehicles. Each time a vehicle is inspected and defects are detected and projected onto the CAD model, the processor 320 may record those three-dimensional defect locations along with associated metadata such as timestamp, vehicle identifier, defect type, and severity. Over time, as many vehicles of the same make and model are inspected, the processor 320 may accumulate a database of defect locations on the CAD model. The processor 320 may accumulate defect frequency data at locations on the CAD model by binning or discretizing the CAD model surface into regions and counting how many defects have been detected in each region across the entire fleet. The discretization may divide the surface into uniform grid cells, into predefined regions corresponding to body panels or components, or into adaptive regions determined through spatial clustering. The accumulated frequency data may reveal which regions of the vehicle are most prone to defects based on fleet-wide experience. The processor 320 may generate a heat map visualization overlaid on the CAD model showing regions with high defect occurrence rates. The heat map may use color coding where hot colors such as red indicate high defect frequency and cool colors such as blue indicate low defect frequency. The heat map visualization may provide valuable insights for quality control, design improvement, and predictive maintenance. Manufacturers can identify problematic design features or manufacturing processes that lead to high defect rates in specific regions. Fleet managers can anticipate where damage is likely to occur and schedule preventive maintenance or monitoring accordingly. The heat map may be displayed on a graphical user interface showing the three-dimensional CAD model with color-coded regions, allowing users to interactively explore defect patterns and access detailed statistics for particular regions of interest.

Figure 3B:
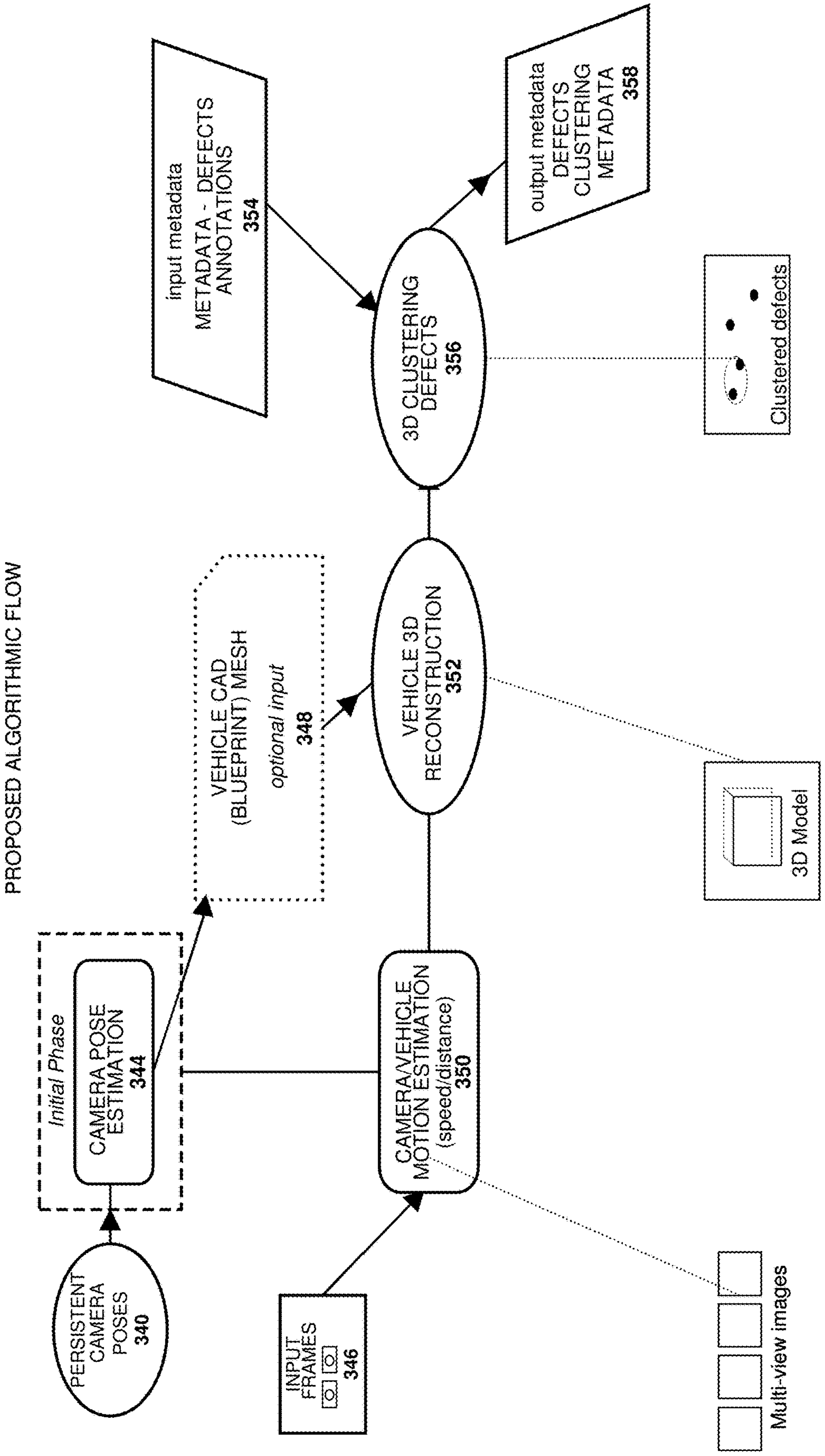
FIG. 3B is a detailed algorithmic flow diagram depicting the processing pipeline for three-dimensional defect clustering, showing the interaction between various computational components from image capture through consolidated defect output.

Turning now also to FIG. 3B, which is a detailed exemplary algorithmic flow diagram depicting the processing pipeline implemented by system 300 or system 100 when augmented with three-dimensional clustering capabilities. FIG. 3B shows how the various computational components interact and the flow of data through the system from image capture through final consolidated defect output. The diagram may illustrate both the primary processing path and optional initial calibration phases that may be performed to establish or refine system parameters.

The system may maintain persistent camera poses 340 stored in memory 330, representing calibration parameters that define the position and orientation of each camera in the multi-camera array relative to a reference coordinate system. These persistent camera poses 340 may be established during initial system installation through calibration procedures or may be updated periodically to account for camera movement or misalignment. The persistent camera poses 340 serve as starting estimates for subsequent processing and enable consistent spatial registration across multiple vehicle inspections.

An optional initial phase 342, indicated by dashed boundaries in FIG. 3B, may be performed either during system setup or dynamically for each inspected vehicle depending on the desired level of accuracy and robustness to vehicle positioning variations. Within the initial phase 342, camera pose estimation 344 may refine or validate the stored camera poses by analyzing the relationship between captured images and the vehicle CAD model 348. The camera pose estimation 344 may retrieve the persistent camera poses 340 as initial estimates, then optimize these pose parameters to achieve optimal alignment between the CAD model and observed vehicle features in captured images. The optimization process may minimize reprojection error as described herein, adjusting camera position and orientation parameters until projected CAD features align closely with observed image features. The refined camera poses output from camera pose estimation 344 may be used for the current inspection and optionally stored back to persistent camera poses 340 to improve future inspections.

Input frames 346 represent the multi-view images captured by cameras 312, 314, 316, 318 or by cameras 112, 114, 116, 118 depending on which system embodiment is implemented. The input frames 346 comprise digital images of the vehicle captured from multiple viewpoints, providing comprehensive coverage of vehicle surfaces from different angles. These input frames 346 serve as the primary data source for subsequent processing stages and contain the raw visual information from which defects will be detected and localized.

Vehicle CAD mesh 348, shown with dashed boundaries to indicate its optional nature, represents a three-dimensional computer-aided design model of the vehicle retrieved from CAD model database 332 based on the vehicle identifier. As previously described, the vehicle CAD mesh 348 may provide high-fidelity geometric information defining the precise shape, dimensions, and surface characteristics of the vehicle. The vehicle CAD mesh 348 may be represented as a polygon mesh comprising vertices and triangular faces, as a set of parametric surfaces, or in other three-dimensional geometric representations. The CAD mesh 348 feeds into multiple downstream processing stages where it serves as a geometric reference for projection operations, reconstruction guidance, and spatial clustering. When vehicle CAD mesh 348 is not available, the system can proceed using only reconstructed geometry as described herein, though the use of CAD mesh 348 when available provides superior accuracy and completeness.

Camera and vehicle motion estimation 350 analyzes the input frames 346 to determine motion parameters characterizing how the vehicle moved through the inspection lane during image capture. For systems where the vehicle moves past stationary cameras, motion estimation 350 computes vehicle velocity and distance traveled, enabling temporal alignment of frames captured at different times and spatial registration of image regions corresponding to different vehicle locations. For systems where cameras may move relative to a stationary vehicle, motion estimation 350 computes camera motion parameters. The motion estimation 350 may employ various computer vision techniques including optical flow analysis, feature tracking across sequential frames, or model-based motion estimation that fits kinematic models to observed feature displacements. The motion parameters output from camera and vehicle motion estimation 350 inform subsequent processing stages that require knowledge of temporal and spatial relationships between frames, such as undercarriage panorama construction described in connection with the described above or sequential frame registration for complete vehicle coverage.

Vehicle three-dimensional reconstruction 352 generates or refines a three-dimensional geometric model of the inspected vehicle using information from multiple sources. When vehicle CAD mesh 348 is provided, the three-dimensional reconstruction 352 may register and align the CAD mesh to the actual vehicle position observed in input frames 346, potentially applying local deformations to accommodate differences between the idealized CAD geometry and the actual vehicle geometry due to manufacturing variations, modifications, or damage. When vehicle CAD mesh 348 is not provided, three-dimensional reconstruction 352 generates a geometric model from scratch using structure-from-motion and multi-view stereo techniques applied to input frames 346, as described in connection herein. The motion parameters from camera and vehicle motion estimation 350 aid the reconstruction process by providing constraints on camera poses and vehicle positions. The output of vehicle three-dimensional reconstruction 352 is a three-dimensional model defining vehicle surface geometry in a consistent coordinate system, serving as the reference framework for subsequent three-dimensional clustering operations.

Metadata for defects annotations 354, shown as input metadata in FIG. 3B, represents defect detections obtained from analysis of input frames 346. These defect detections may be generated through the template-based comparison process described in connection with system 100 and method 200, through machine learning-based detection using trained neural networks, through exemplar-based detection as described herein, or through other defect detection approaches. Each defect detection in metadata 354 includes a two-dimensional location specifying where in a particular image frame the defect appears, along with associated information such as defect classification, confidence score, and visual characteristics. The metadata 354 may include multiple detections of the same physical defect observed from different camera viewpoints, which will subsequently be consolidated through clustering.

Three-dimensional clustering defects 356 performs the core consolidation operation that distinguishes unique physical defects from redundant multi-view detections. The clustering module 356 receives as inputs the three-dimensional model from vehicle three-dimensional reconstruction 352 and the defect detections from metadata 354. For each defect detection, clustering module 356 projects the two-dimensional image location onto the three-dimensional model surface through ray tracing and surface intersection computations as described in connection with step 408 of method 400. This projection converts the collection of two-dimensional defect detections distributed across multiple images into a set of three-dimensional points located on the vehicle surface model. The clustering module 356 then applies spatial clustering algorithms to group three-dimensional points based on proximity along the model surface, with each resulting cluster representing a unique physical defect that was detected from one or more viewpoints. The clustering may employ density-based clustering algorithms, geodesic distance thresholds measured along the surface mesh, or graph-based clustering approaches as described previously. The three-dimensional clustering defects 356 module effectively solves the multi-view correspondence problem by leveraging the geometric structure provided by the three-dimensional model, enabling accurate consolidation even for defects observed from widely different viewpoints where image-based matching would be unreliable.

Defects clustering metadata 358, shown as output metadata in FIG. 3B, represents the final consolidated defect information output from the processing pipeline. Each entry in the output metadata 358 corresponds to a single unique physical defect identified on the vehicle, with redundant multi-view detections having been consolidated into single entries. For each defect, the metadata 358 includes a representative three-dimensional location on the vehicle surface, typically computed as the centroid or weighted average of the clustered three-dimensional points. The metadata 358 also includes defect classification, severity scores computed based on factors such as spatial extent and deviation magnitude, visual evidence from one or more contributing detections, and confidence assessments. This consolidated defect metadata 358 provides clear, unambiguous information about vehicle condition and forms the basis for generating inspection reports, updating vehicle records, and making maintenance or liability determinations.

Figure 3D:
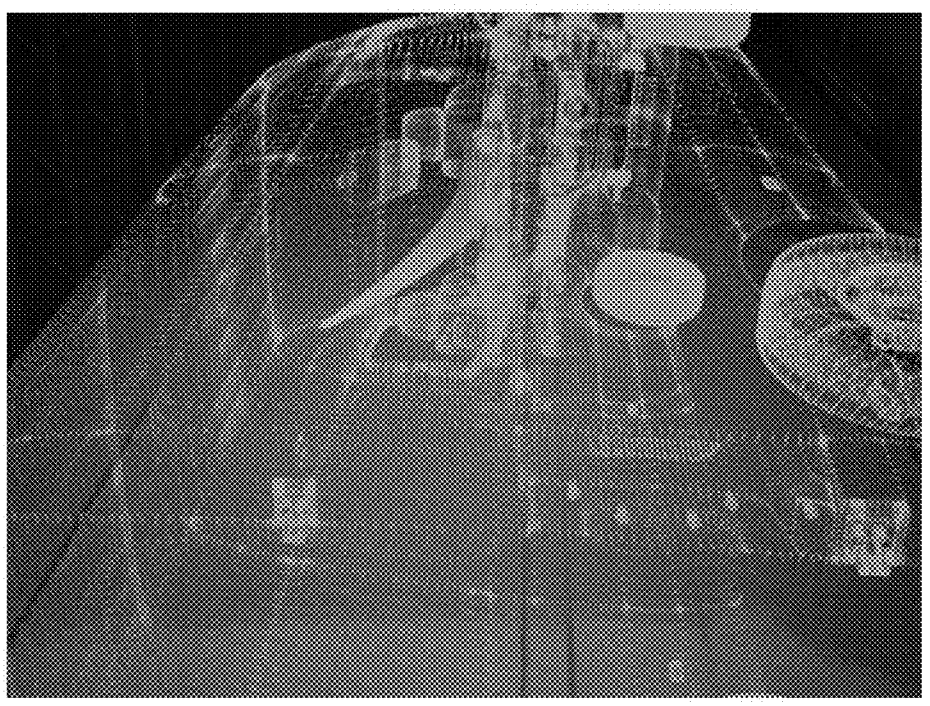
FIG. 3D is an illustration showing a CAD model mesh projection with proper geometric alignment to vehicle features visible in captured images.
Figure 3C:
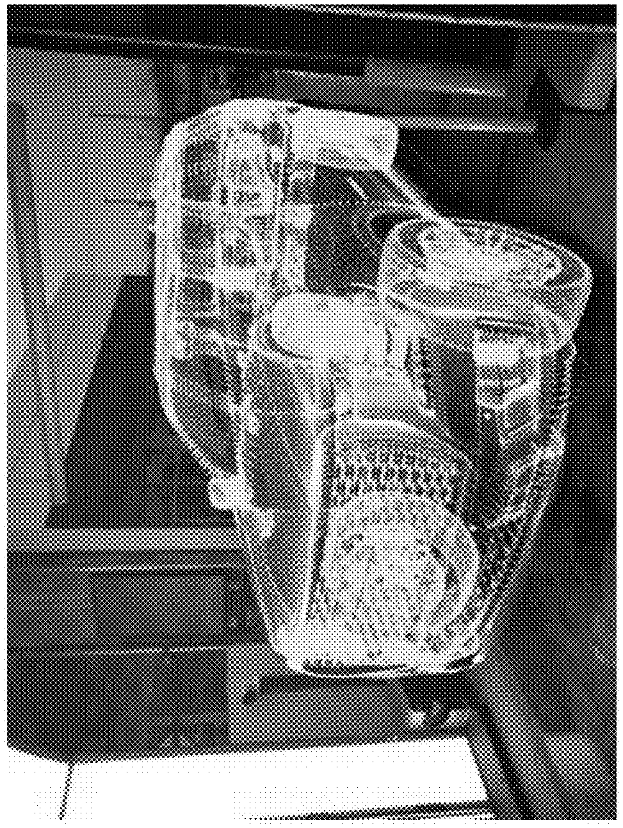
FIG. 3C is a visual representation showing projection of a vehicle CAD model onto captured image planes with wireframe overlay for alignment verification.

The algorithmic flow depicted in FIG. 3B illustrates the flexibility and modularity of the system architecture. The optional nature of vehicle CAD mesh 348 and initial phase 342 enables the system to adapt to different operational scenarios and data availability conditions. FIG. 3C illustrates a visual representation showing how the vehicle CAD model 348 is projected onto captured image planes. The figure depicts a three-dimensional visualization where the CAD model appears as a wireframe or mesh representation overlaid in the three-dimensional space of the inspection environment. In FIG. 3C, the CAD model is projected onto an image captured from one viewpoint, which may correspond to a side-view camera such as camera 312 or camera 114. The projected CAD model appears as a wireframe overlay or colored mesh such as the mesh depicted in FIG. 3D, superimposed on the photograph of the actual vehicle, with edges and surfaces of the CAD geometry aligned with corresponding edges and surfaces visible in the image. Proper alignment is evidenced by CAD model edges coinciding with vehicle body panel boundaries, door edges, window frames, and other distinctive geometric features. The quality of alignment achieved demonstrates the accuracy of camera pose estimation and validates that the geometric transformation from three-dimensional model space to two-dimensional image space has been correctly established. The ability to achieve accurate alignment across multiple disparate viewpoints confirms that the camera pose estimation process has correctly determined the spatial relationship between all cameras and the vehicle geometry. During defect detection and analysis, operators reviewing flagged anomalies can reference the CAD overlay to understand the three-dimensional geometry of the vehicle region where a defect is located, aiding in defect classification and severity assessment.

When high-fidelity CAD models are available and camera calibration is stable, the system leverages this prior knowledge to achieve optimal accuracy and efficiency. When CAD models are unavailable or camera poses require refinement, the system can perform dynamic reconstruction and calibration to maintain robust operation. The integration of motion estimation 350 enables the system to handle both stationary and moving vehicles, accommodating diverse inspection station configurations. The modular processing pipeline allows individual components to be updated, replaced, or enhanced without requiring redesign of the entire system, providing long-term flexibility as computer vision and machine learning technologies continue to advance.

Figure 3E:
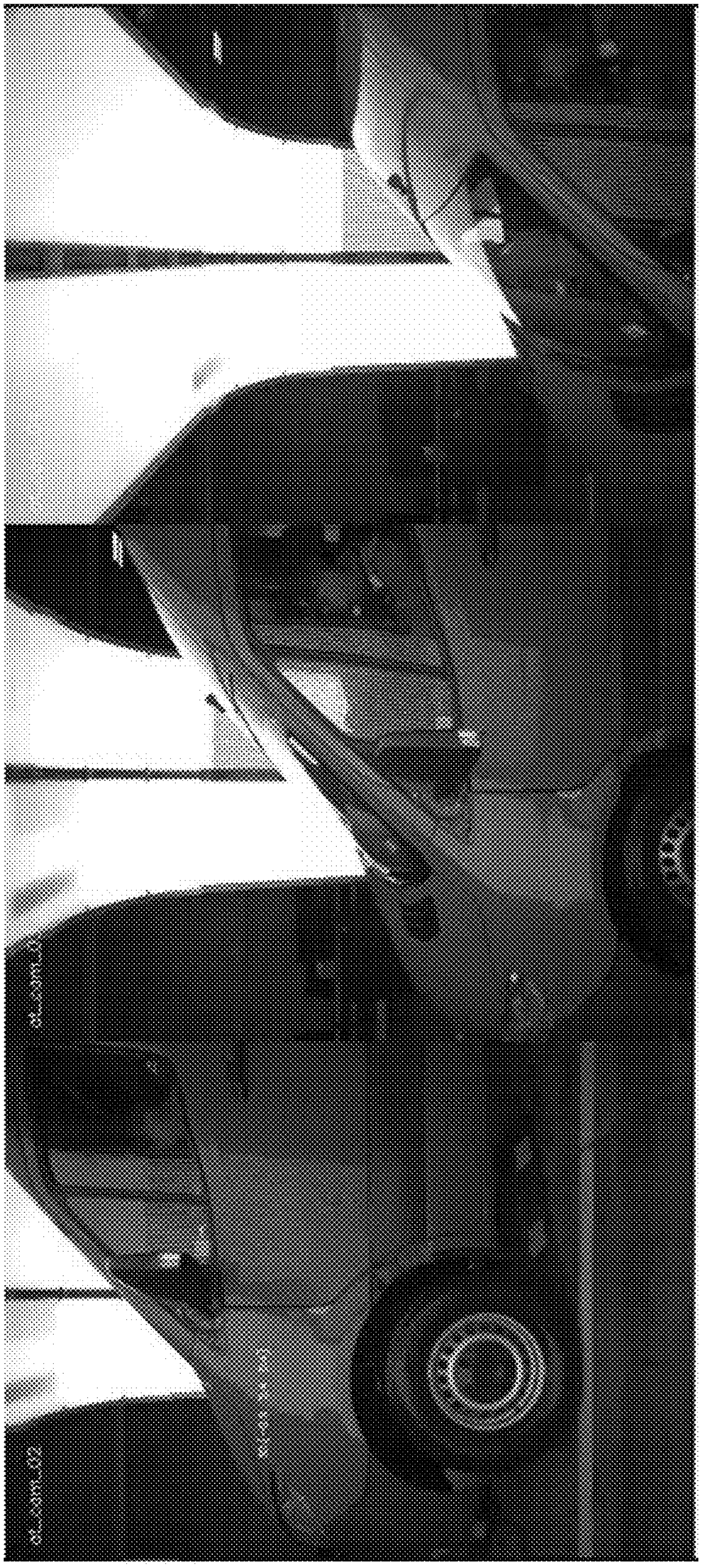
FIG. 3E is a multi-view representation depicting detected defects from multiple camera perspectives and their corresponding three-dimensional locations on a vehicle reference model.

FIG. 3E depicts the vehicle as viewed from multiple camera perspectives, with each camera view showing one or more detected defects marked with indicator symbols. The defects visible across multiple views may include a dent on a body panel that is observable from both side-view and front-view cameras, a scratch that extends across a region visible to overlapping camera fields of view, or other damage manifestations that produce detections in more than one captured image. Without three-dimensional clustering, each of these detections would be reported as a separate defect, leading to redundant and confusing inspection results. The three-dimensional vehicle model, which may be the CAD model 348 or a reconstructed model from module 352, is displayed with projected defect locations marked on the model surface. Defects that were detected from multiple viewpoints now appear as groups of closely-spaced points on the three-dimensional surface, with each group representing the set of two-dimensional detections that correspond to the same physical defect. The clustering algorithm has analyzed the spatial proximity of these projected points along the surface topology and determined that points within each group are sufficiently close to represent multiple observations of a single damage location rather than separate damage instances. The consolidated defect locations are marked on the three-dimensional model surface, with each cluster represented by a single indicator such as a colored point, a geometric marker, or a highlighted surface region. Visual representation may use color coding or size variation to convey additional information such as the number of views from which the defect was observed, with defects visible from more viewpoints indicated by larger markers or more saturated colors to reflect higher confidence. The spatial distribution of consolidated defects across the vehicle surface provides an intuitive overview of vehicle condition, enabling rapid assessment of damage patterns and identification of regions with multiple defects. The three-dimensional visualization may be interactively manipulated by operators through rotation, zooming, and panning operations to examine defects from arbitrary viewing angles. Selection of individual defect markers may trigger display of associated information including the contributing two-dimensional detections from each camera view, classification of defect type, severity scores, and image evidence showing the defect appearance in original captured frames. The capability to visualize clustered defects in three-dimensional space on the vehicle model provides significant advantages over traditional two-dimensional defect reporting, enabling operators to quickly understand defect locations in relation to vehicle geometry and to distinguish defects that are close together on the surface but would appear far apart in any single two-dimensional image view.

Figure 3F:
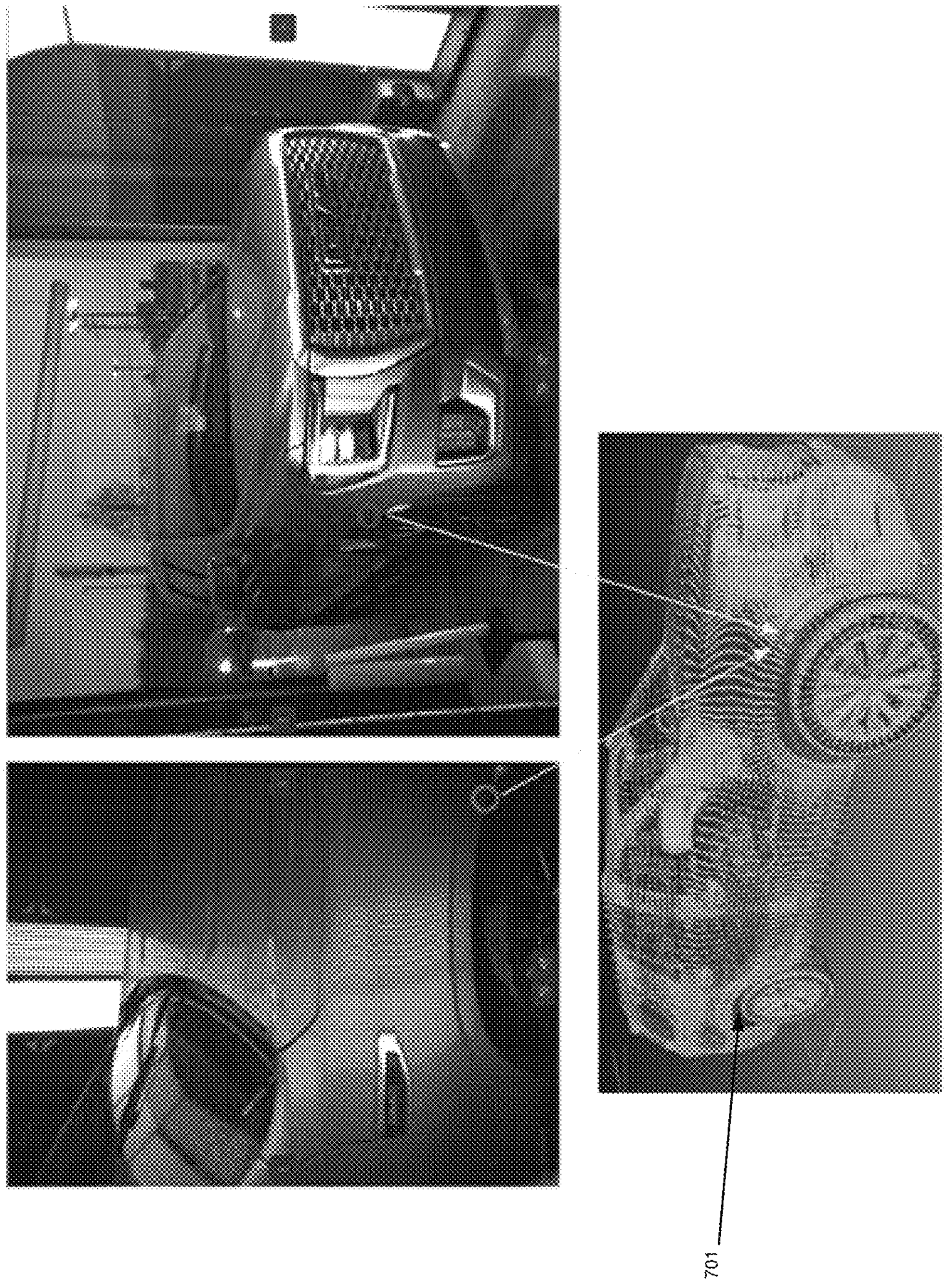
FIG. 3F is a visualization showing accumulated defect data clustered on a three-dimensional CAD model with heat map overlay correlated to actual defect appearances in captured images.
Figure 3G:
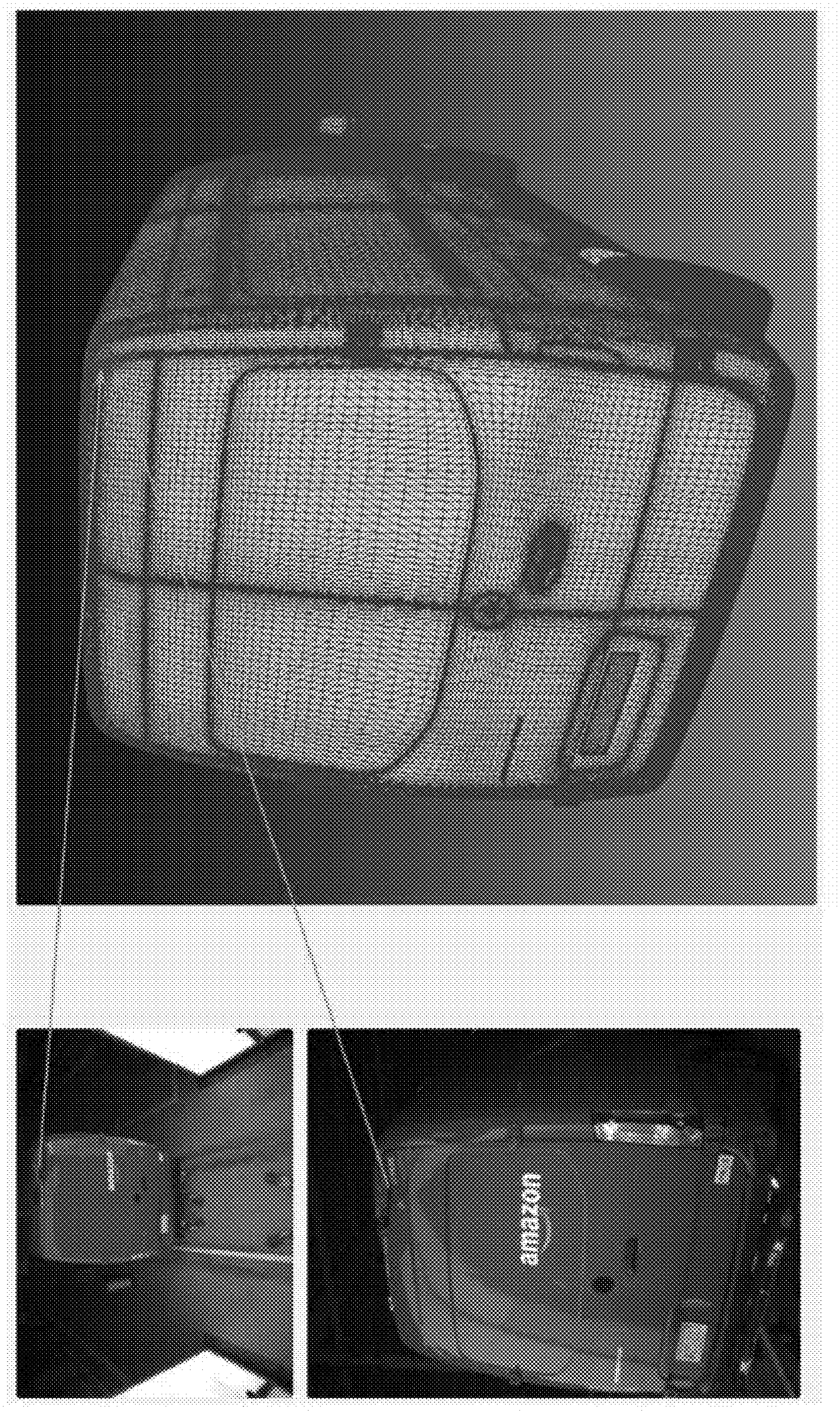
FIG. 3G is an illustration of a vehicle CAD model rendered with color-coded regions indicating defect frequency or occurrence rates across multiple vehicle inspections.

FIG. 3F illustrates an optional visualization capability wherein accumulated defect data clustered on the three-dimensional CAD model across multiple vehicle inspections is displayed as a heat map overlay 701, with the heat map correlated to actual defect appearances in captured images to provide comprehensive damage pattern analysis. FIG. 3G illustrates a vehicle CAD model rendered with color-coded regions indicating defect frequency or occurrence rate, wherein regions that have exhibited defects frequently across many inspections of multiple vehicles are rendered in warm colors such as red or orange, while regions that rarely exhibit defects may be rendered in gray (or any other color), optionally with intermediate frequencies represented by graduated color transitions (not shown). The heat map visualization provides immediate visual indication of which vehicle regions are most prone to damage based on fleet-wide historical data accumulated through operation of the inspection system over time. Alongside or integrated with the heat map display, FIG. 3G shows one or more actual captured images from recent vehicle inspections with detected defects highlighted or marked, wherein the spatial locations of these real defects correspond to high-frequency regions indicated by the heat map. This correlation between statistical aggregate data represented by the heat map and specific real damage instances visible in photographs provides validation of the heat map patterns and enables operators to understand what types of damage manifestations correspond to the high-frequency regions. For example, a heat map may indicate elevated defect frequency in the lower portion of front bumper regions, and the correlated real images show that this pattern arises from scrapes and scratches caused by parking impacts or contact with curbs and parking barriers. The integration of heat map visualization with real image evidence creates a powerful tool for root cause analysis and quality improvement initiatives. Manufacturing defects that consistently appear at specific locations due to process issues or design weaknesses are immediately apparent as persistent hot spots in the heat map, enabling targeted corrective actions. Damage patterns that arise from specific use cases or environmental conditions can be identified by filtering heat map data based on vehicle deployment location, time period, or usage characteristics, revealing insights such as increased undercarriage damage in regions with harsh winter conditions or elevated body panel damage in urban environments with tight parking spaces. The heat map visualization shown in FIG. 3G may be generated by processor 320 executing analysis routines that access historical inspection records stored in memory 330, aggregate defect locations spatially by binning or discretizing the CAD model surface into regions, and compute statistics such as defect frequency, defect density, or defect severity metrics for each region. The color mapping function that converts statistical values to display colors may be adjusted by operators to highlight specific data ranges of interest or to accommodate different visualization preferences. Interactive features may enable operators to select hot spot regions in the heat map and retrieve detailed information including the number of defects observed in that region, temporal distribution of defect occurrences, associated vehicle identifiers, and access to original image evidence showing defects in that location across multiple inspections.

Figure 4:
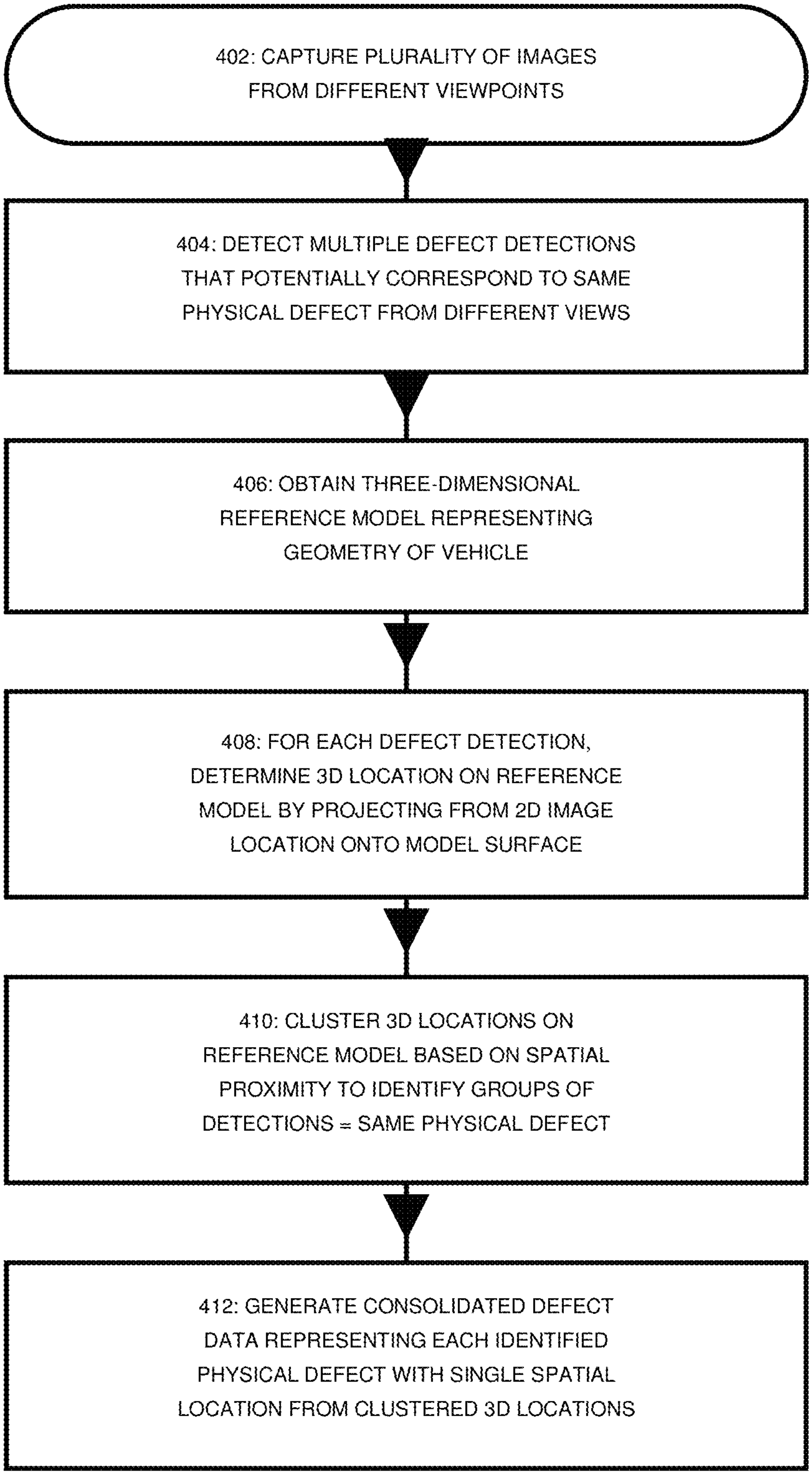
FIG. 4 is a flowchart depicting a method for consolidating vehicle defect detections from multiple viewpoints using three-dimensional spatial clustering in accordance with another embodiment of the invention.

Turning now also to FIG. 4, there is illustrated a flowchart depicting a method 400 for consolidating vehicle defect detections from multiple viewpoints in accordance with another embodiment of the invention. Method 400 may optionally be implemented using system 300 depicted in FIG. 3A, with the steps of method 400 performed by processor 320 executing program instructions stored in memory 330. At step 402, a plurality of images of a vehicle are captured from different viewpoints using a multi-camera array such as multi-camera array 310. The plurality of images provide coverage of the vehicle from multiple angles, with different cameras viewing the vehicle from different positions.

At step 404, multiple defect detections that potentially correspond to a same physical defect observed from different viewpoints are detected in the plurality of images. The detection process may employ any of various defect detection techniques including template matching as described in connection with system 100 and method 200, machine learning-based detection using trained neural networks, anomaly detection algorithms, or other computer vision approaches. The key characteristic is that defects are detected independently in each image, such that a single physical defect visible in multiple images generates separate detections in each of those images. At this stage, the system has not yet determined which detections correspond to the same physical defect versus which detections represent distinct defects.

At step 406, a three-dimensional reference model representing geometry of the vehicle is obtained. The three-dimensional reference model may comprise a computer-aided design model retrieved from a database based on the vehicle identifier, or it may comprise a three-dimensional model generated through reconstruction techniques as will be described below. The reference model provides geometric information defining the shape and spatial extent of vehicle surfaces.

At step 408, for each defect detection, a three-dimensional location on the reference model is determined by projecting the defect detection from its two-dimensional image location onto a surface of the reference model. This projection step may establish the spatial correspondence between two-dimensional image detections and three-dimensional locations on the vehicle. The projection computation may use camera calibration parameters defining the relationship between image coordinates and three-dimensional coordinates, including intrinsic parameters such as focal length and principal point as well as extrinsic parameters defining camera pose relative to the reference model. For each defect detection characterized by two-dimensional pixel coordinates in a particular camera image, processor may compute a ray extending from the camera optical center through those pixel coordinates into three-dimensional space according to the camera projection model. The intersection of this ray with the three-dimensional reference model surface yields the three-dimensional coordinates of the defect on the model. If the reference model is represented as a polygon mesh, intersection computation may involve testing the ray against mesh triangles to find the intersection point. If the model is represented as parametric surfaces, intersection may involve solving equations defining the surfaces for points along the ray. The result of step 408 is a set of three-dimensional defect locations distributed across the surface of the reference model.

At step 410, the three-dimensional locations on the reference model are clustered based on spatial proximity to identify groups of defect detections corresponding to the same physical defect. Clustering aggregates multiple three-dimensional locations that are close together on the reference model surface into single groups or clusters. Each cluster represents a unique physical defect that was detected from multiple viewpoints and thus generated multiple detections at nearby three-dimensional locations. The clustering algorithm may account for the surface topology of the reference model, measuring proximity along the surface rather than through straight-line Euclidean distance in space. Suitable clustering approaches may include geodesic distance-based clustering where distance is measured along shortest paths on the surface mesh, density-based clustering such as DBSCAN that groups points in high-density regions, or graph-based clustering where the mesh vertices and edges define a graph and clustering is performed using graph partitioning or community detection algorithms. The clustering process may require selection of distance thresholds or other parameters that determine when two three-dimensional locations are considered close enough to belong to the same cluster. These parameters may be predetermined based on typical defect sizes and camera positioning, or they may be learned from training data. The output of clustering is a partition of the three-dimensional defect locations into disjoint groups, with each group corresponding to one physical defect.

At step 412, consolidated defect data representing each identified physical defect with a single spatial location derived from the clustered three-dimensional locations is generated. For each cluster produced by the clustering process, the consolidated defect data may include a representative spatial location computed by aggregating the three-dimensional locations in that cluster. The representative location may be the centroid or average of clustered locations, the median location, the location with highest associated confidence score, or other aggregation function. The consolidated defect data may also include metadata such as defect type, severity score, image evidence, and other relevant information. Importantly, each physical defect appears exactly once in the consolidated defect data even though it may have been detected in multiple images. This consolidation may eliminate the confusion and redundancy present in unprocessed multi-view detections. The consolidated defect data may be formatted as an inspection report, stored in a database, displayed on a user interface, or transmitted to external systems for further processing. The consolidation achieved through three-dimensional clustering provides clear, accurate representation of vehicle condition that correctly counts the number of distinct defects and precisely localizes each defect on the vehicle geometry. The consolidated defect data may be used for creating an interactive UI, an alert or a message.

In optional embodiment(s), the three-dimensional reference model obtained at step 406 comprises a computer-aided design Optionally, the method further comprises the three-dimensional reference model comprising a computer-aided design (CAD) model of the vehicle retrieved from a database based on a vehicle identifier. The vehicle identifier may be determined through license plate recognition, RFID reading, manual input, or other identification mechanisms. The CAD model database may contain high-fidelity geometric models for numerous vehicle makes, models, and years, indexed by identifiers such as vehicle identification numbers, make-model-year combinations, or standardized vehicle classification codes. The processor may query the database with the vehicle identifier and retrieve the corresponding CAD model. Using a CAD model as the reference geometry may provide several advantages over reconstructing geometry from captured images. CAD models may be highly accurate since they are created from original design data rather than estimated through noisy measurement processes. CAD models may be complete, representing all vehicle surfaces without gaps or missing regions that commonly occur in reconstructed models. CAD models may be available immediately without requiring time-consuming reconstruction computations. CAD models may be consistent across inspections, enabling reliable spatial correspondence for temporal defect tracking. For these reasons, CAD model-based approaches may be preferred when suitable models are available.

Optionally, the method further comprises determining camera poses for cameras in the multi-camera array relative to the CAD model through an optimization process. Camera pose determination may establish the position and orientation of each camera with respect to the CAD model coordinate system, providing the extrinsic calibration parameters needed for projecting image locations to three-dimensional model locations. The determination process may comprise projecting the CAD model onto image planes of the cameras, meaning that for hypothesized camera pose parameters, the processor computes where various features or points on the CAD model would appear in each camera's images according to the camera projection equations. The processor may then optimize the camera poses to minimize reprojection error between projected CAD features and observed vehicle features in the images. Observed vehicle features may comprise edge locations, corner points, distinctive visual patterns, or other salient image features that can be matched to corresponding features on the CAD model. Reprojection error quantifies the distance between where CAD features project to image locations under current pose estimates and where those features are actually observed in captured images. Minimization of reprojection error may be typically performed through iterative nonlinear optimization techniques such as, for example, Levenberg-Marquardt algorithm, Gauss-Newton method, or gradient descent, adjusting camera pose parameters at each iteration to reduce total reprojection error across all observed feature correspondences. The optimization converges to camera poses that best align the CAD model with observed images. This pose determination process may be performed once during system installation and calibration, or it may be performed dynamically for each inspected vehicle to accommodate variations in vehicle positioning. Dynamic pose estimation may provide robustness to vehicle positioning variations and enables accurate projection even when vehicles do not stop at precisely the same location in the inspection lane at every visit.

In optional embodiment(s), obtaining the three-dimensional reference model at step 406 comprises generating the reference model by three-dimensional reconstruction from the plurality of images rather than retrieving a pre-existing CAD model. This alternative approach is useful when CAD models are not available for the inspected vehicle, such as for older vehicles, custom vehicles, or vehicles from manufacturers that do not provide CAD model access. Three-dimensional reconstruction generates a geometric model from the captured images using computer vision techniques. Structure-from-motion algorithms analyze the plurality of images to simultaneously estimate camera poses and reconstruct three-dimensional structure by identifying corresponding features across images and triangulating their three-dimensional positions. Multi-view stereo algorithms densify the reconstruction by computing depth maps for each camera and fusing them into a complete three-dimensional model. Surface reconstruction algorithms generate continuous mesh representations from reconstructed point clouds using techniques such as Poisson surface reconstruction or ball-pivoting algorithms. The reconstructed three-dimensional model serves the same role as a CAD model in subsequent processing, providing the reference geometry onto which defect detections are projected and clustered. While reconstructed models generally have lower accuracy and completeness compared to CAD models, they enable the three-dimensional clustering approach to be applied even when CAD models are unavailable.

In optional embodiment(s), which specifies how defect detection at step 404 may be performed, detecting the multiple defect detections comprises retrieving a reference template corresponding to the vehicle, aligning the reference template to the captured images through computation of geometric transformation, computing similarity maps between the aligned reference template and the captured images using techniques such as deep feature correlation, edge distance analysis, or phase correlation, and identifying candidate defects based on deviations in the similarity maps where similarity falls below thresholds or where deviation values exceed thresholds. This specification shows how the template-based detection approach described in connection with system 100 and method 200 can serve as the detection component within the three-dimensional clustering pipeline of method 400. The integration provides a complete end-to-end system wherein template matching detects defects in two-dimensional images and three-dimensional clustering consolidates those detections into unique physical defects with accurate spatial localization.

In optional embodiment(s), method 400 further comprises temporal tracking and comparison of defects across multiple inspections. The consolidated defect data generated at step 412 is compared against defect data from a prior inspection of the vehicle stored in memory from a previous time when the same vehicle was inspected. The comparison determines whether each physical defect identified in the current inspection is persistent, meaning it was also present in the prior inspection, or newly appeared, meaning it was not present in the prior inspection. The comparison uses the three-dimensional locations on the reference model to spatially align defects across inspections. Because both current and prior defects are localized on the same three-dimensional reference model, spatial correspondence between defects from different inspection times can be established reliably even if the vehicle was positioned differently in the inspection lane at different visits. Defects at nearby three-dimensional locations across inspections are matched as corresponding to the same physical defect tracked over time, while defects in the current inspection that have no matching defect in the prior inspection are classified as newly appeared, and defects in the prior inspection that have no match in the current inspection are classified as resolved or repaired. The temporal tracking capability is critical for applications such as rental car damage liability determination where the system must distinguish pre-existing damage from new damage that occurred during a rental period, or fleet maintenance tracking where the system monitors damage accumulation over time and triggers maintenance actions when defects persist or worsen beyond thresholds. The use of three-dimensional reference model as the common spatial reference enables temporal tracking that is invariant to vehicle positioning variations across inspections.

In optional embodiment(s), a vehicle inspection system with integrated template matching and three-dimensional clustering is provided. This system corresponds to system 300 depicted in FIG. 3A. The system comprises a multi-camera array positioned to capture images of a vehicle from multiple viewpoints and one or more processors configured to perform integrated detection and consolidation. The processor retrieves both a reference template and a three-dimensional CAD model corresponding to the vehicle, providing both photometric reference information for appearance comparison and geometric reference information for spatial clustering. The processor detects defects by comparing the captured images to the reference template using template alignment, similarity map computation, and deviation analysis as described previously. The processor then projects detected defects from two-dimensional image locations onto the three-dimensional CAD model through ray tracing and surface intersection computations. The processor clusters the projected defects on the CAD model using spatial proximity-based clustering to consolidate redundant detections from different viewpoints into unique physical defects. The processor generates an inspection report with consolidated defect locations presenting each physical defect once with accurate three-dimensional localization. This integrated system provides comprehensive vehicle inspection capability combining accurate two-dimensional defect detection with three-dimensional multi-view consolidation.

In optional embodiment(s), the processor is further configured to perform automatic detection of camera misalignment using CAD model reprojection analysis. Over time, cameras in multi-camera arrays may become misaligned due to vibration, temperature changes, impacts, or mounting hardware loosening. Misalignment degrades system accuracy by invalidating stored calibration parameters that specify camera poses. Manual recalibration is time-consuming and requires expert technicians, so automatic detection of when recalibration is needed provides significant operational benefit. The processor projects the CAD model onto image planes of the plurality of cameras using stored camera calibration parameters that were previously determined through calibration procedures. This projection computes where features of the CAD model should appear in each camera's images if the stored calibration parameters are correct and the cameras remain properly aligned. The processor then computes reprojection errors between the projected CAD model and observed vehicle features in captured images. Observed vehicle features such as edges, corners, and distinctive visual patterns are extracted from captured images and matched to corresponding features on the CAD model. For each matched feature, reprojection error measures the distance between where the CAD model predicts the feature should appear based on stored calibration and where the feature is actually observed. When cameras are properly aligned, reprojection errors remain small since stored calibration accurately reflects camera poses. When cameras become misaligned, reprojection errors increase because stored calibration no longer matches actual camera poses. The processor detects camera misalignment when reprojection errors exceed a threshold, which may be a predetermined value based on acceptable alignment tolerances or an adaptive threshold based on statistical analysis of error distributions. Upon detecting misalignment, the processor generates a calibration alert identifying misaligned cameras. The alert may be displayed to operators on a user interface, logged to maintenance records, or transmitted to maintenance personnel. The alert prompts recalibration of the identified cameras to restore system accuracy. The automatic misalignment detection capability reduces system downtime and maintenance costs by enabling proactive recalibration before misalignment becomes severe enough to compromise inspection quality.

It is expected that during the life of a patent maturing from this application many relevant methods and systems will be developed and the scope of the term CAD, processing unit, sensor and template are intended to include all such new technologies a priori.

As used herein the term "about" may refer to ±10%.

The terms "comprises", "comprising", "includes", "including", "having" and their conjugates mean "including but not limited to".

The term "consisting of" means "including and limited to".

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for consolidating vehicle defect detections from multiple viewpoints, comprising:

capturing a plurality of images of a vehicle from different viewpoints using a multi-camera array;

detecting, in the plurality of images, multiple defect detections that potentially correspond to a same physical defect observed from different viewpoints;

obtaining a three-dimensional reference model representing geometry of the vehicle and comprises a computer-aided design (CAD) model of the vehicle retrieved from a database based on a vehicle identifier;

for each defect detection, determining a three-dimensional location on the reference model by projecting the defect detection from its two-dimensional image location onto a surface of the reference model;

clustering the three-dimensional locations on the reference model based on spatial proximity to identify groups of defect detections corresponding to the same physical defect; and generating consolidated defect data representing each identified physical defect with a single spatial location derived from the clustered three-dimensional locations;

further comprising determining camera poses for cameras in the multi-camera array relative to the CAD model by:

projecting the CAD model onto image planes of the cameras; and optimizing the camera poses to minimize reprojection error between projected CAD features and observed vehicle features in the images.

2. The method of claim 1, wherein obtaining the three-dimensional reference model comprises generating the reference model by three-dimensional reconstruction from the plurality of images.

3. The method of claim 1, wherein detecting the multiple defect detections comprises:

retrieving a reference template corresponding to the vehicle;

aligning the reference template to the captured images;

computing similarity maps between the aligned reference template and the captured images; and identifying candidate defects based on deviations in the similarity maps.

4. The method of claim 1, further comprising:

comparing the consolidated defect data against defect data from a prior inspection of the vehicle to determine whether each physical defect is persistent or newly appeared;

wherein the comparison uses the three-dimensional locations on the reference model to spatially align defects across inspections.

5. The method of claim 1, further comprising:

tracking defect locations on the CAD model across multiple inspections of multiple vehicles;

accumulating defect frequency data at locations on the CAD model; and generating a heat map visualization overlaid on the CAD model showing regions with high defect occurrence rates.

6. The method of claim 1, wherein the multi-camera array comprises at least four cameras positioned around a vehicle inspection lane with overlapping fields of view covering at least 85% of visible vehicle exterior surfaces.

7. A method for consolidating vehicle defect detections from multiple viewpoints, comprising:

capturing a plurality of images of a vehicle from different viewpoints using a multi-camera array;

detecting, in the plurality of images, multiple defect detections that potentially correspond to a same physical defect observed from different viewpoints;

obtaining a three-dimensional reference model representing geometry of the vehicle;

for each defect detection, determining a three-dimensional location on the reference model by projecting the defect detection from its two-dimensional image location onto a surface of the reference model;

clustering the three-dimensional locations on the reference model based on spatial proximity to identify groups of defect detections corresponding to the same physical defect; and generating consolidated defect data representing each identified physical defect with a single spatial location derived from the clustered three-dimensional locations, wherein clustering the three-dimensional locations comprises:

computing geodesic distances along the reference model surfaces using mesh connectivity information;

applying density-based clustering algorithms with adaptive distance thresholds based on local surface curvature; and consolidating defect clusters with cluster validity indices ensuring each cluster represents a single physical defect with confidence exceeding a predetermined threshold.

8. The method of claim 7, wherein the three-dimensional reference model comprises a computer-aided design (CAD) model of the vehicle retrieved from a database based on a vehicle identifier.

9. A method for consolidating vehicle defect detections from multiple viewpoints, comprising:

capturing a plurality of images of a vehicle from different viewpoints using a multi-camera array;

detecting, in the plurality of images, multiple defect detections that potentially correspond to a same physical defect observed from different viewpoints;

obtaining a three-dimensional reference model representing geometry of the vehicle;

for each defect detection, determining a three-dimensional location on the reference model by projecting the defect detection from its two-dimensional image location onto a surface of the reference model;

clustering the three-dimensional locations on the reference model based on spatial proximity to identify groups of defect detections corresponding to the same physical defect; and generating consolidated defect data representing each identified physical defect with a single spatial location derived from the clustered three-dimensional locations;

wherein the three-dimensional reference model comprises a computer-aided design (CAD) model of the vehicle retrieved from a database based on a vehicle identifier, wherein projecting the defect detection comprises:

applying inverse camera calibration matrices to convert two-dimensional pixel coordinates to normalized camera coordinates;

constructing a three-dimensional ray vector extending from a camera optical center through the normalized coordinates into world space using camera extrinsic rotation and translation parameters; and computing ray-surface intersection between the ray vector and triangular mesh faces of the CAD model to yield three-dimensional coordinates where the defect observation ray intersects the vehicle surface.

10. A vehicle inspection system comprising:

a multi-camera array positioned to capture images of a vehicle from multiple viewpoints;

a memory which stores program instructions and a template library;

one or more processors configured to access the memory for:

retrieving a reference template from the template library and a three-dimensional CAD model corresponding to the vehicle;

detecting defects by comparing the captured images to the reference template;

projecting detected defects from two-dimensional image locations onto the three-dimensional CAD model;

clustering the projected defects on the CAD model to consolidate redundant detections from different viewpoints; and generating an inspection report with consolidated defect locations;

wherein the one or more processors are configured to project detected defects by:

computing, for each defect detection at two-dimensional pixel coordinates in a camera image, a ray extending from a camera optical center through the pixel coordinates into three-dimensional space; and determining an intersection point between the ray and a surface of the CAD model using ray-casting algorithms and calibrated camera parameters.

11. The system of claim 10, wherein the one or more processors are further configured to:

track defect locations on the CAD model across multiple inspections of multiple vehicles;

accumulate defect frequency data at locations on the CAD model; and generate a heat map visualization overlaid on the CAD model showing regions with high defect occurrence rates based on fleet-wide inspection data.

12. The system of claim 10, wherein the one or more processors are configured to detect defects by:

aligning the reference template to the captured images through geometric transformation;

computing one or more spatially-registered similarity maps between the aligned reference template and the captured images;

generating a deviation map from the similarity maps; and identifying defects as regions where deviation exceeds adaptive thresholds.

13. The system of claim 10, wherein the one or more processors are further configured to:

compare consolidated defect data from a current inspection against defect data from a prior inspection of the same vehicle;

spatially align defects across inspections using three-dimensional locations on the CAD model; and classify each defect as persistent or newly appeared based on presence or absence in the prior inspection.

14. The system of claim 10, wherein the multi-camera array is configured for mobile deployment and comprises:

portable mounting structures enabling setup and calibration at temporary inspection locations within a predetermined time period;

battery power systems providing at least a predetermined duration of continuous operation;

wireless communication modules for transmitting inspection data to central processing servers; and ruggedized enclosures rated for outdoor operation across a specified temperature range.

15. The system of claim 10, wherein the one or more processors execute ray-casting algorithms that:

project two-dimensional defect detections through three-dimensional space using calibrated camera parameters with sub-pixel accuracy;

perform geometric intersection computations between projected rays and CAD model surface meshes using accelerated spatial indexing structures; and complete three-dimensional projection operations for multiple defect detections within a predetermined processing time using parallel processing architectures.

16. The system of claim 10, wherein the one or more processors are further configured to:

obtain a first inspection dataset from a mobile inspection system;

obtain a second inspection dataset from a fixed-position inspection system;

align defect locations from both datasets onto the three-dimensional CAD model as a common reference; and compare defects detected in the first and second inspection datasets using the aligned defect locations to enable cross-system defect tracking.

17. A vehicle inspection system comprising:

a multi-camera array positioned to capture images of a vehicle from multiple viewpoints;

a memory which stores program instructions and a template library;

one or more processors configured to access the memory for:

retrieving a reference template from the template library and a three-dimensional CAD model corresponding to the vehicle;

detecting defects by comparing the captured images to the reference template;

projecting detected defects from two-dimensional image locations onto the three-dimensional CAD model;

clustering the projected defects on the CAD model to consolidate redundant detections from different viewpoints; and generating an inspection report with consolidated defect locations;

wherein the one or more processors are configured to cluster the projected defects by:

computing geodesic distances between three-dimensional defect locations along surfaces of the CAD model; and grouping defect locations having geodesic distances below a threshold distance into clusters representing unique physical defects.

18. The system of claim 17, wherein the one or more processors are configured to project detected defects by:

computing, for each defect detection at two-dimensional pixel coordinates in a camera image, a ray extending from a camera optical center through the pixel coordinates into three-dimensional space; and determining an intersection point between the ray and a surface of the CAD model using ray-casting algorithms and calibrated camera parameters.

19. A vehicle inspection system comprising:

a multi-camera array positioned to capture images of a vehicle from multiple viewpoints;

a memory which stores program instructions and a template library;

one or more processors configured to access the memory for:

retrieving a reference template from the template library and a three-dimensional CAD model corresponding to the vehicle;

detecting defects by comparing the captured images to the reference template;

projecting detected defects from two-dimensional image locations onto the three-dimensional CAD model;

clustering the projected defects on the CAD model to consolidate redundant detections from different viewpoints; and generating an inspection report with consolidated defect locations; wherein the one or more processors are further configured to:

determine camera poses for cameras in the multi-camera array relative to the CAD model by optimizing reprojection error between projected CAD features and observed vehicle features in the captured images.

* * * * *